(12) United States Patent
Gammel et al.

(10) Patent No.: US 7,567,668 B2
(45) Date of Patent: Jul. 28, 2009

(54) CALCULATING UNIT AND METHOD FOR PERFORMING AN ARITHMETIC OPERATION WITH ENCRYPTED OPERANDS

(75) Inventors: Berndt Gammel, Markt Schwaben (DE); Franz Klug, Munich (DE); Oliver Kniffler, Munich (DE)

(73) Assignee: Infineon Technologies AG (DE)

( * ) Notice: Subject to any disclaimer, the term of this patent is extended or adjusted under 35 U.S.C. 154(b) by 824 days.

(21) Appl. No.: 10/893,163

(22) Filed: Jul. 16, 2004

(65) Prior Publication Data

US 2005/0036618 A1    Feb. 17, 2005

Related U.S. Application Data

(63) Continuation of application No. PCT/EP03/00180, filed on Jan. 10, 2003.

(30) Foreign Application Priority Data

Jan. 16, 2002    (DE) ................................ 102 01 449

(51) Int. Cl.
*H04K 1/00* (2006.01)
*H04L 9/00* (2006.01)
*H04L 9/28* (2006.01)

(52) U.S. Cl. ..................................................... 380/28
(58) Field of Classification Search .................. 380/28
See application file for complete search history.

(56) References Cited

U.S. PATENT DOCUMENTS 5,479,512 A   12/1995   Weiss (Continued)

FOREIGN PATENT DOCUMENTS

DE    44 09 834 A1    9/1994

(Continued)

OTHER PUBLICATIONS www.archive.org, "Online!", XP002247737, Dec. 2, 2000.

(Continued)

*Primary Examiner*—Andrew L Nalven
*Assistant Examiner*—Jason K Gee
(74) *Attorney, Agent, or Firm*—Dickstein, Shapiro, LLP.

(57) ABSTRACT

A calculating unit for performing an arithmetic operation with at least two operands, the at least two operands being encrypted, includes an arithmetic-logic unit with a first input for the first encrypted operand, a second input for the second encrypted operand, a third input for an encryption parameter and an output for an encrypted result of the operation, the arithmetic-logic unit being formed so as to operate on the first input, the second input and the third input by means of arithmetic sub-operations, while considering the type of encryption of the operands, such that at the output, an encrypted result is obtained which equals a value that would be obtained if the first operand was subjected to the arithmetic operation in a non-encrypted state and if the second operand would be subjected to the arithmetic operation in a non-encrypted state, and a result obtained was subsequently encrypted, no decryption of the operands being performed in the arithmetic-logic unit. In this manner, a processor system may be obtained in which no data whatsoever occurs in clear text, i.e. in a non-encrypted form, since no decryption upstream of an arithmetic-logic unit and no encryption downstream of the arithmetic-logic unit are required, as the arithmetic-logic unit operates with encrypted input operands to obtain an encrypted result. Interception attacks on transmission lines of the calculating unit are thus ruled out.

27 Claims, 13 Drawing Sheets

U.S. PATENT DOCUMENTS

| | | | |
|---|---|---|---|
| 5,504,915 | A | 4/1996 | Rarick |
| 6,088,800 | A * | 7/2000 | Jones et al. .................. 713/189 |
| 6,199,091 | B1 | 3/2001 | Kobayashi |
| 6,356,636 | B1 * | 3/2002 | Foster et al. .................. 380/30 |
| 2002/0169968 | A1 | 11/2002 | Gammel |
| 2003/0005313 | A1 | 1/2003 | Gammel |

FOREIGN PATENT DOCUMENTS

| | | |
|---|---|---|
| WO | WO-01/40950 A2 | 6/2001 |
| WO | WO-01/54083 A1 | 7/2001 |

OTHER PUBLICATIONS

Kuhn, M.G., "Cipher Instruction Search Attack on the Bus-Encryption Security Microcontroller DS5002FP", IEEE Transactions on Computers, 47(10):1153-1157, Oct. 1998.

Behrooz Parhami, "Basic Addition and Counting", Computer Arithmetic, pp. 75-90.

Kulisch, Sandra, et al., "Security in Java", Jan. 2000.

* cited by examiner

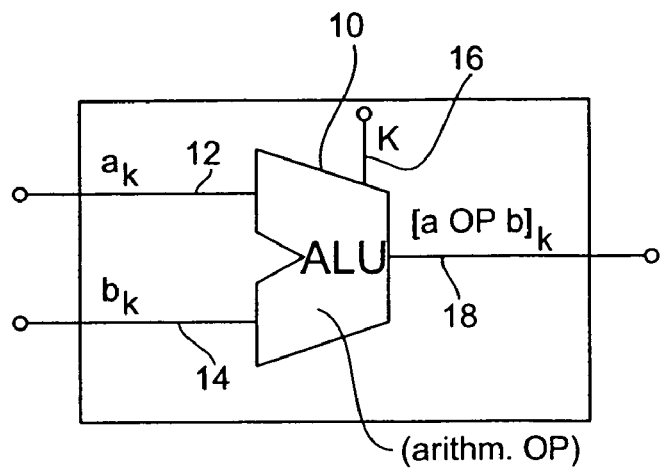
FIG 1
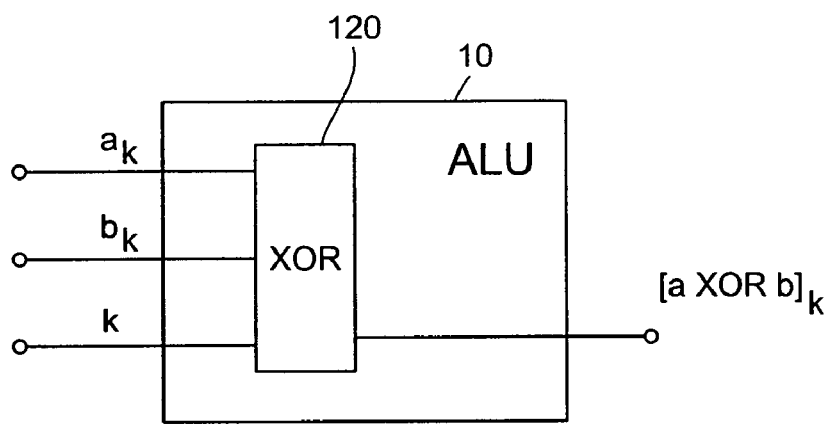
FIG 2A
XOR Operation:
| $k_n$ | $a_n$ | $b_n$ | $a_{kn}$ | $b_{kn}$ | $a_n$ XOR $b_n$ | $a_n$ XOR $b_n$ XOR $b_n$ | $a_{kn}$ XOR $b_{kn}$ | $a_{kn}$ XOR $b_{kn}$ XOR $b_n$ | Vergleich |
|---|---|---|---|---|---|---|---|---|---|
| 0 | 0 | 0 | 0 | 0 | 0 | 0 | 0 | 0 | 1 |
| 0 | 0 | 1 | 0 | 1 | 1 | 1 | 1 | 1 | 1 |
| 0 | 1 | 0 | 1 | 0 | 1 | 1 | 1 | 1 | 1 |
| 0 | 1 | 1 | 1 | 1 | 0 | 0 | 0 | 0 | 1 |
| 1 | 0 | 0 | 1 | 1 | 0 | 1 | 0 | 1 | 1 |
| 1 | 0 | 1 | 1 | 0 | 1 | 0 | 1 | 0 | 1 |
| 1 | 1 | 0 | 0 | 1 | 1 | 0 | 1 | 0 | 1 |
| 1 | 1 | 1 | 0 | 0 | 0 | 1 | 0 | 1 | 1 |
FIG 2B

ALU

AND Operation:

| $k_n$ | $a_n$ | $b_n$ | $a_{kn}$ | $b_{kn}$ | $a_n$ AND $b_n$ | ($a_n$ AND $b_n$) XOR $k_n$ | $a_{kn} b_{kn} + a_{kn} k_n + a_{kn} k_n$ | Vergleich |
|---|---|---|---|---|---|---|---|---|
| 0 | 0 | 0 | 0 | 0 | 0 | 0 | 0 | 1 |
| 0 | 0 | 1 | 0 | 1 | 0 | 0 | 0 | 1 |
| 0 | 1 | 0 | 1 | 0 | 0 | 0 | 0 | 1 |
| 0 | 1 | 1 | 1 | 1 | 1 | 1 | 1 | 1 |
| 1 | 0 | 0 | 1 | 1 | 0 | 1 | 1 | 1 |
| 1 | 0 | 1 | 1 | 0 | 0 | 1 | 1 | 1 |
| 1 | 1 | 0 | 0 | 1 | 0 | 1 | 1 | 1 |
| 1 | 1 | 1 | 0 | 0 | 1 | 0 | 0 | 1 |

OR Operation:

| $k_n$ | $a_n$ | $b_n$ | $a_{kn}$ | $b_{kn}$ | $a_n$ OR $b_n$ | ($a_n$ OR $b_n$) XOR $k_n$ | $a_{kn} b_{kn} + a_{kn}$ not $k_n + a_{kn}$ not $k_n$ | Vergleich |
|---|---|---|---|---|---|---|---|---|
| 0 | 0 | 0 | 0 | 0 | 0 | 0 | 0 | 1 |
| 0 | 0 | 1 | 0 | 1 | 1 | 1 | 1 | 1 |
| 0 | 1 | 0 | 1 | 0 | 1 | 1 | 1 | 1 |
| 0 | 1 | 1 | 1 | 1 | 1 | 1 | 1 | 1 |
| 1 | 0 | 0 | 1 | 1 | 0 | 1 | 1 | 1 |
| 1 | 0 | 1 | 1 | 0 | 1 | 0 | 0 | 1 |
| 1 | 1 | 0 | 0 | 1 | 1 | 0 | 0 | 1 |
| 1 | 1 | 1 | 0 | 0 | 1 | 0 | 0 | 1 |

NOR Operation:

| $k_n$ | $a_n$ | $b_n$ | $a_{kn}$ | $b_{kn}$ | $a_n$ NOR $b_n$ | $(a_n$ OR $b_n)$XOR $k_n$ | not $a_{kn}$ not $b_{kn}$ + not $a_{kn} k_n$ + not $b_{kn} k_n$ | Vergleich |
|---|---|---|---|---|---|---|---|---|
| 0 | 0 | 0 | 0 | 0 | 1 | 1 | 1 | 1 |
| 0 | 0 | 1 | 0 | 1 | 0 | 0 | 0 | 1 |
| 0 | 1 | 0 | 1 | 0 | 0 | 0 | 0 | 1 |
| 0 | 1 | 1 | 1 | 1 | 0 | 0 | 0 | 1 |
| 1 | 0 | 0 | 1 | 1 | 1 | 0 | 0 | 1 |
| 1 | 0 | 1 | 1 | 0 | 0 | 1 | 1 | 1 |
| 1 | 1 | 0 | 0 | 1 | 0 | 1 | 1 | 1 |
| 1 | 1 | 1 | 0 | 0 | 0 | 1 | 1 | 1 |

2.5. NAND Operation:

| $k_n$ | $a_n$ | $b_n$ | $a_{kn}$ | $b_{kn}$ | $a_n$ NAND $b_n$ | $(a_n$NAND$b_n)$XOR$k_n$ | not $a_{kn}$ not $b_{kn}$ + not $a_{kn}$ not $k_n$ + not $b_{kn}$ not $k_n$ | Vergleich |
|---|---|---|---|---|---|---|---|---|
| 0 | 0 | 0 | 0 | 0 | 1 | 1 | 1 | 1 |
| 0 | 0 | 1 | 0 | 1 | 1 | 1 | 1 | 1 |
| 0 | 1 | 0 | 1 | 0 | 1 | 1 | 1 | 1 |
| 0 | 1 | 1 | 1 | 1 | 0 | 0 | 0 | 1 |
| 1 | 0 | 0 | 1 | 1 | 1 | 0 | 0 | 1 |
| 1 | 0 | 1 | 1 | 0 | 1 | 0 | 0 | 1 |
| 1 | 1 | 0 | 0 | 1 | 1 | 0 | 0 | 1 |
| 1 | 1 | 1 | 0 | 0 | 0 | 1 | 1 | 1 |

| ADD Operation | $k_n$ | $a_n$ | $b_n$ | $c_n$ | $a_{kn}$ | $b_{kn}$ | $c_{kn}$ | $c_p$ | $c_k$ | Vergleich der Überträge |
|---|---|---|---|---|---|---|---|---|---|---|
| 0 | 0 | 0 | 0 | 0 | 0 | 0 | 0 | 0 | 0 | 1 |
| 1 | 0 | 0 | 0 | 1 | 0 | 0 | 1 | 0 | 0 | 1 |
| 2 | 0 | 0 | 1 | 0 | 0 | 1 | 0 | 0 | 0 | 1 |
| 3 | 0 | 0 | 1 | 1 | 0 | 1 | 1 | 1 | 1 | 1 |
| 4 | 0 | 1 | 0 | 0 | 1 | 0 | 0 | 0 | 0 | 1 |
| 5 | 0 | 1 | 0 | 1 | 1 | 0 | 1 | 1 | 1 | 1 |
| 6 | 0 | 1 | 1 | 0 | 1 | 1 | 0 | 1 | 1 | 1 |
| 7 | 0 | 1 | 1 | 1 | 1 | 1 | 1 | 0 | 0 | 1 |
| 8 | 1 | 0 | 0 | 0 | 1 | 0 | 0 | 0 | 0 | 1 |
| 9 | 1 | 0 | 0 | 1 | 0 | 0 | 1 | 0 | 0 | 1 |
| 10 | 1 | 0 | 1 | 0 | 0 | 1 | 0 | 1 | 1 | 1 |
| 11 | 1 | 0 | 1 | 1 | 0 | 1 | 1 | 0 | 0 | 1 |
| 12 | 1 | 1 | 0 | 0 | 1 | 0 | 1 | 1 | 1 | 1 |
| 13 | 1 | 1 | 0 | 1 | 1 | 0 | 0 | 1 | 1 | 1 |
| 14 | 1 | 1 | 1 | 0 | 1 | 0 | 1 | 1 | 1 | 1 |
| 15 | 1 | 1 | 1 | 1 | 0 | 0 | 0 | 1 | 1 | 1 |

CALCULATING UNIT AND METHOD FOR PERFORMING AN ARITHMETIC OPERATION WITH ENCRYPTED OPERANDS

CROSS-REFERENCE TO RELATED APPLICATION

This application is a continuation of co-pending International Application No. PCT/EP03/00180, filed Jan. 10, 2003, which designated the United States and was not published in English, and is herein incorporated by reference in its entirety.

BACKGROUND OF THE INVENTION

1. Field of the Invention

The present invention relates to data processing units and, in particular, to data processing units requiring a processing of data or addresses at a high security level which is protected against physical attacks and interception.

2. Description of Prior Art

In calculating and/or processing security-relevant data, use is made of microprocessors or security tokens or other data processing units requiring a processing of data at a high security level which is protected against physical attacks and interception. Cache and buffer memories, register sets as well as transmission paths, for example in the form of buses, on microprocessors, represent regular structures on a chip which are easy to identify. Thus they represent preferred points of attack. Attacks may consist in intercepting by means of pin attacks or in a current-profile analysis.

By means of encryption methods, external memories, buffer memories and buses can be effectively protected, so that the data processed, such as user data or programs, are moved and stored on the entire chip preferably only in an encrypted form.

FIG. 10 depicts a diagrammatic overview of a calculating unit.

The calculating unit comprises an arithmetic-logic unit (ALU) 800 as a central unit. A minimal ALU, which is able to perform an operation with two operands, requires two input buses A, B (802, 804) and an output bus Z (806). Both input buses and the output bus of the ALU 800 are connected to a central bus F (808). Two further buses D, E (810, 812) are also typically connected to the central bus 808, the bus 810 being connected to a cache M2 (814) which in turn is connected to an external memory M1 (818) via a memory bus C (816). In addition, in the embodiment shown in FIG. 10, register sets M3 (820) are provided for a calculating unit, which register sets comprise registers wherein ALU input data or ALU output data may be stored which (initially) are not intended to get into the cache 814 or into the external memory 818, or which are not to be loaded from the register sets into the external memory until the end of a relatively long calculation.

In a calculating unit performing security-critical calculations, the data is encrypted before being stored in the various memories M1 to M3. In addition, in order to prevent an attack on the bus lines 802, 804, 806, 810, 812, and 816, it is also favorable that the data be transmitted via these bus lines in an encrypted form. In this case, two decryption circuits DEC (DEC=decrypt) 822, 824 precede the two ALU inputs to decrypt the operands present on the buses A, B, such as data or addresses that are to be processed by the ALU 800, before processing them. To be able to protect the result of the ALU operation as well, an encryption device ENC (ENC=encrypt) 826 follows the output of the ALU 800, so that encrypted data is present on the buses 802, 804, 806.

Even though this concept is able to effectively suppress attacks on bus lines, such as, for example, the central bus 808 as well as the memory buses 810, 812, 816, it is, however, disadvantageous in that unprotected clear-text data is present between the two decryption circuits 822, 824 and the encryption circuit 826, so that even though it is rendered more difficult for an attacker to find out where the ALU 800 is in the calculating unit, the attacker nevertheless has an easy job once he or she has localized the decryption devices, since clear-text data is present at the outputs of the decryption devices 822 and 824.

On the other hand, the data must be decrypted, since the ALU operations, which may be present, for example, in the form of an arithmetic basic operation, such as AND, OR, XOR, NAND, NOR, NOT or ADD, cannot simply be performed on encrypted data since the encryption and decryption operations and the basic operation generally do not commutate, which will lead to a distortion of the results. In order to secure this security leak nevertheless, it is usually preferred to place the decryption devices 822, 824 and the encryption device 826 as closely as possible to the ALU 800, so that the transmission lines on which the clear-text data runs become as short as possible, so as to undermine attacks in this manner. Alternatively, the transmission lines on which clear-text data is transmitted may be "hidden" in the chip using technological measures, for example using specific doping profiles or using a plurality of dummy lines so that it is rendered difficult, again, for an attacker to actually find out on which lines clear-text data is transmitted, whereas no data at all, or only diversion, or fake, data, is transmitted on the dummy lines.

These conventional measures for protecting the calculating unit against attacks are problematic in that they require additional outlay and limit the freedom in designing the ALU. A limitation of the freedom of design is disadvantageous in particular if the ALU is to be a high-performance ALU that has to perform a plurality of calculations, in particular, for example, calculations of long numbers. In order to keep the calculating time within reasonable limits nevertheless, the ALU should be designed in a performance-optimized manner. Of course, a client will expect a high level of security from any security system. At the same time, however, the client also expects tolerably long, and preferably short, calculating times. Short calculating times are important for a security system to be accepted on the market, since long calculating times in a security identification will be considered very annoying on the part of the client.

SUMMARY OF THE INVENTION

It is the object of the present invention to provide a concept which is simple and inexpensive to implement for performing an operation on an encrypted operand, a carry select adder for encrypted data as well as a cryptography processor which nevertheless provide a high level of security against attacks.

In accordance with a first aspect, the present invention provides a calculating unit for performing an operation on operands, wherein at least one of the operands is encrypted using an encryption algorithm and an encryption parameter so as to obtain an encrypted result of the operation, the calculating unit having: a processing unit having an input for an operand or a negated version of the operand, an input for the at least one encrypted operand or a negated version of the at least one encrypted operand, having an input for the encryption parameter with which the at least one operand is encrypted, and having an output for the encrypted result, the processing unit being formed to perform one or several mathematical sub-operations which together result in a ciphertext calculating specification derived from a clear-text calculating specification for the operation with non-encrypted operands such that the non-encrypted operand is replaced, in the clear-text calculating specification from which the at least one encrypted operand results, by a mathematical combination of the at least one encrypted operand and the encryption parameter, the mathematical combination being a reversal of the encryption algorithm, and the clear-text calculating specification being transformed, due to the mathematical combination, into the one or several mathematical sub-operations representing the ciphertext calculating specification, which mathematical sub-operations obtain, as an input quantity, merely the encrypted operand or a negated version of same, or a combination of the encrypted operand or of the negated version of the encrypted operand with the other operands.

In accordance with a second aspect, the present invention provides a carry select adder for adding first and second encrypted operands to obtain an encrypted result, the first and second encrypted operands each comprising a plurality of bits, an encryption parameter being provided for each bit of the same order of the operands, the carry select adder having: a first ripple carry adder with a plurality of bit slice means for adding the encrypted bits of the operands from a least significant bit of the operands up to a first boundary bit of the operands to produce an encrypted carry output bit of the first ripple carry adder; first and second ripple carry adders with a plurality of bit slice means for adding the encrypted bits of the operands from a bit which is by one position more significant than the first boundary bit, up to a second boundary bit, wherein each bit slice means comprises a calculating unit for performing an operation on operands, wherein at least one of the operands is encrypted using an encryption algorithm and an encryption parameter so as to obtain an encrypted result of the operation, the calculating unit having: a processing unit having an input for an operand or a negated version of the operand, an input for the at least one encrypted operand or a negated version of the at least one encrypted operand, having an input for the encryption parameter with which the at least one operand is encrypted, and having an output for the encrypted result, the processing unit being formed to perform one or several mathematical sub-operations which together result in a ciphertext calculating specification derived from a clear-text calculating specification for the operation with non-encrypted operands such that the non-encrypted operand is replaced, in the clear-text calculating specification from which the at least one encrypted operand results, by a mathematical combination of the at least one encrypted operand and the encryption parameter, the mathematical combination being a reversal of the encryption algorithm, and the clear-text calculating specification being transformed, due to the mathematical combination, into the one or several mathematical sub-operations representing the ciphertext calculating specification, which mathematical sub-operations obtain, as an input quantity, merely the encrypted operand or a negated version of same, or a combination of the encrypted operand or of the negated version of the encrypted operand with the other operands, the mathematical operation being an adder operation so as to produce, at a carry input, an internal encrypted aggregate bit and an internal encrypted carry output bit using an encrypted bit of the first operand, an encrypted bit of the second operand and an encrypted carry input bit, wherein all bit slice means further comprise an associated re-encryptor to achieve a re-encryption of the carry input bit encrypted in accordance with an encryption parameter for the bit slice means from which same is derived, into an encryption with the encryption parameter for current bit slice means, wherein the second ripple carry adder and the third ripple carry adder being arranged in parallel, wherein a key ($k_{n+1}$) for the least significant bit slice means of the second ripple carry adder can be applied as a carry input bit for a least significant bit slice means of the second ripple carry adder, and wherein an inverted key (NOT $k_{n+1}$) for the least significant bit slice means of the third ripple carry adder may be applied as a carry input bit for a least significant bit slice means of the third ripple carry adder; a re-encryptor for re-encrypting the carry output bit of the first ripple carry adder on a key basis of the least significant bit slice means of the second ripple carry adder; and select means for selecting the encrypted aggregate bits of the second ripple carry adder if the re-encrypted carry output bit of a most significant bit slice means of the first ripple carry adder is identical with a logical "0", or for selecting the encrypted aggregate bits of the third ripple carry adder if the re-encrypted carry output bit of the first ripple carry adder is identical with a logical "1", as encrypted aggregate bits.

In accordance with a third aspect, the present invention provides a cryptography processor, having: a memory for storing data encrypted with a first encryption algorithm; a first decryptor for decrypting data which is stored in the memory and is encrypted with the first encryption algorithm; a second encryptor for encrypting data, which are obtained from the first decryptor, with a second encryption algorithm; a calculating unit for performing an operation on operands, wherein at least one of the operands is encrypted using an encryption algorithm and an encryption parameter so as to obtain an encrypted result of the operation, the calculating unit having:

a processing unit having an input for an operand or a negated version of the operand, an input for the at least one encrypted operand or a negated version of the at least one encrypted operand, having an input for the encryption parameter with which the at least one operand is encrypted, and having an output for the encrypted result, the processing unit being formed to perform one or several mathematical sub-operations which together result in a ciphertext calculating specification derived from a clear-text calculating specification for the operation with non-encrypted operands such that the non-encrypted operand is replaced, in the clear-text calculating specification from which the at least one encrypted operand results, by a mathematical combination of the at least one encrypted operand and the encryption parameter, the mathematical combination being a reversal of the encryption algorithm, and the clear-text calculating specification being transformed, due to the mathematical combination, into the one or several mathematical sub-operations representing the ciphertext calculating specification, which mathematical sub-operations obtain, as an input quantity, merely the encrypted operand or a negated version of same, or a combination of the encrypted operand or of the negated version of the encrypted operand with the other operands, which is arranged to obtain data output from the second encryptor; a second decryptor for decrypting data output from the calculating unit in accordance with the second encryption algorithm; and a first encryptor for encrypting the data, which are output from the second decryptor, in accordance with the first encryption algorithm, the first encryptor being coupled to the memory so that the data encrypted with the first encryption algorithm may be fed to the memory.

In accordance with a fourth aspect, the present invention provides a method for performing an operation on operands, wherein at least one of the operands is encrypted using an encryption algorithm and an encryption parameter to obtain an encrypted result of the operation, the method having the following steps: performing one or several mathematical sub-operations which together result in a ciphertext calculating specification derived from a clear-text calculating specification for the operation with non-encrypted operands, such that the non-encrypted operand, from which the at least one encrypted operand results, is replaced by a mathematical combination of the at least one encrypted operand and the encryption parameter, the mathematical combination being a reversal of the encryption algorithm, and the clear-text calculating specification being transformed, due to the mathematical combination, into the one or several mathematical sub-operations representing the ciphertext calculating specification, which mathematical sub-operations obtain, as an input quantity, merely the encrypted operand or a negated version of same, or a combination of the encrypted operand or of the negated version of the encrypted operand with the other operands.

In accordance with a fifth aspect, the present invention provides a method for forming a calculating-unit means for performing an operation on operands, at least one of the operands being encrypted using an encryption algorithm and an encryption parameter to obtain an encrypted result of the operation, the method having the following steps: providing a clear-text calculating specification for the operation; replacing, in the clear-text calculating specification, a non-encrypted operand corresponding to the encrypted operand, by a mathematical combination of the encrypted operand and the encryption parameter, the mathematical combination being a reversal of the encryption algorithm, so as to obtain ciphertext calculating specification; transforming the ciphertext calculating specification obtained into one or several mathematical sub-operations which obtain, as an input quantity, merely the encrypted operand or a negated version of same, or a combination of the encrypted operand or of the negated version of the encrypted operand with the other operands; and implementing the one or several mathematical sub-operations to obtain the calculating-unit means.

In accordance with a sixth aspect, the present invention provides an apparatus for forming a calculating-unit means for performing an operation on operands, at least one of the operands being encrypted using an encryption algorithm and an encryption parameter to obtain an encrypted result of the operation, the apparatus having: means for providing a clear-text calculating specification for the operation; means for replacing, in the clear-text calculating specification, a non-encrypted operand corresponding to the encrypted operand, by a mathematical combination of the encrypted operand and the encryption parameter, the mathematical combination being a reversal of the encryption algorithm, so as to obtain ciphertext calculating specification; means for transforming the ciphertext calculating specification obtained into one or several mathematical sub-operations which obtain, as an input quantity, merely the encrypted operand or a negated version of same, or a combination of the encrypted operand or of the negated version of the encrypted operand with the other operands; and means for implementing the one or several mathematical sub-operations to obtain the calculating-unit means.

The present invention is based on the findings that the highest level of security can by achieved in that the calculating unit works with encrypted operands on the whole, so that thus no decryption is performed at the input of the processing unit and no encryption is performed at the output of the processing unit or ALU. In accordance with the invention, the ALU is implemented such that in addition to having an input for the first encrypted operand and an input for the second encrypted operand, it also comprises a third input for an encryption parameter, the ALU being implemented to link the encrypted operands and the encryption parameters in accordance with a ciphertext calculating specification while considering the manner in which the two operands are encrypted, that an encrypted result is obtained at the output, which result is equal to a value which would be obtained if the first operand was subjected to the arithmetic operation in accordance with a clear-text calculating specification in the non-encrypted state and if the second operand was subjected to the arithmetic operation in accordance with a clear-text calculating specification in the non-encrypted state, and if a result obtained was subsequently encrypted. Put in other words, the arithmetic operation to be performed between the two encrypted operands, such as, for example, an OR operation as a clear-text calculating specification, is replaced by several arithmetic sub-operations forming a ciphertext calculating specification, the arithmetic sub-operations being selected such that they either have the encrypted operands, the negated encrypted operands, the encryption parameter or the negated encryption parameter as an input.

If need be, further sub-operations exist which have, as an input, intermediate results obtained from the encrypted input operands and from the key, so that clear-text input operands themselves are not present at any location in the ALU. To increase the level of security, it is preferred that no intermediate results from clear-text input operands exist either. Using the example of the OR operation this would mean that the encrypted operands and the encryption parameter are be subjected to several AND operations and several OR operations, and, if need be, to negation operations, so that the ALU provides a result which equals the result that would be obtained if the encrypted input operands were initially decrypted, subjected to a single OR operation and then re-encrypted.

If use is made of an encryption method consisting of an encryption algorithm and a key, a different structure of the ALU for an arithmetic operation results for each encryption algorithm. In this case, the level of security may be raised simply by changing the key of the encryption algorithm either per operation or per several operations, which has the advantage that varying keys may be used in case of an identical ALU structure, which makes it even more difficult for an attacker to derive clear-text data from the structure of the ALU, for example.

Put in other words, the processing unit of the inventive calculating unit is implemented to perform one or several mathematical sub-operations which together result in a calculating specification derived from a specification for the operation with non-encrypted operands, such that the at least one non-encrypted operand, from which the at least one encrypted operand results, is replaced by a mathematical combination of the at least one encrypted operand and the encryption parameter, the mathematical combination being a reversal of the encryption algorithm with which the encrypted operand is encrypted.

By means of the mathematical combination, the clear-text calculating specification is transformed into the ciphertext calculating specification comprising the one or several mathematical sub-operations which obtain, as an input quantity, only the encrypted operand or a negated version of same, or a combination of the encrypted operand and/or of the negated version of same with the other operands. The non-encrypted operand itself does not appear at any location as an input quantity for a mathematical sub-operation and therefore cannot be intercepted.

It is clear that the ciphertext calculating specification which results from the one or several mathematical sub-operations may be implemented in any manner desired. In other words, this means that the mathematical sub-operations which together form the ciphertext calculating specification may be of any kind. What is required is merely that they together form this very ciphertext calculating specification which provides the same results as the corresponding clear-text calculating specification after an encryption of the result.

A further precondition is that the encryption algorithm with which the at least one operand is encrypted be a reversible encryption algorithm. If the encryption algorithm is a bitwise XOR function or XNOR function, for example, the reversal of the encryption algorithm is simple. Same is, again, the XOR and/or XNOR function.

The inventive concept may in principle be implemented for any reversible encryption algorithm, depending on the amount of complexity that can be justified in each case. The simplest implementation of the encrypted calculating unit is using the bitwise XOR operation with a key as the encryption algorithm, since the reversal of the encryption algorithm is, again, an XOR operation with the same key. Of course, the same also goes for the XNOR function.

In preferred embodiments of the present invention, the encryption algorithm itself is, again, a bitwise arithmetic operation, such as an XOR or an XNOR operation. Considering the conversion rules for the arithmetic operations, an arithmetic equation can be found, and starting from the arithmetic operation to be calculated and from the encryption algorithm, in which equation no clear-text operands but encrypted operands occur which are logically linked to each other and/or to the encryption parameter using the sub-operations, so as to provide, again, the same result that would be obtained if the input parameters were initially decrypted, subjected to the arithmetic operation and then encrypted again.

An advantage of the present invention is that in the inventive calculating units, there are no more clear-text operands occurring at any location, but only encrypted operands. Thus it is no longer possible for an attacker to intercept clear-text operands at any location in the calculating unit.

A further advantage of the present invention is that, if the encryption method for which the inventive calculating unit is implemented is used for storing the data in the memory, no more clear-text data is present at any location in a computer, but only encrypted data and encryption parameters are visible. If the inventive calculating unit is implemented on a chip card which cannot be guaranteed to always be in a secure environment, but is—on the contrary—in the hands of an attacker and at the free disposal of same, the attacker cannot acquire any clear-text data from the chip card in any way since there is only encrypted data. Clear-text data to be processed would therefore be encrypted in a secure environment before being loaded onto the chip card, a secure environment being, for example, a stationary terminal, which might be, for example, a cash dispenser which only certain persons are authorized to access. The interface with the chip card is structured such that an attacker cannot draw the clear-text data out of the cash dispenser since the secure terminal encrypts the clear-text data before it reaches its interface with the chip card, and since the secure terminal encrypts the clear-text data in such a manner, in particular, that the encryption algorithm conforms to the structure of the ALU on the chip card. Then no back and forth encryption is required at any location, so that an actually closed system exists. This closed system may easily be protected if the place where the clear-text data is introduced into the system is in a safe environment.

A further advantage of the present invention is that the ALU may be implemented in a plurality of different ways depending on the chip technology available. For example, the sub-operations may be selected in many different ways depending on equivalence rules of the arithmetic, which may be binary, for example, so as to still provide the same result, i.e. the same truth table. If a complete system, e.g. NAND or NOR, exists, an implementation may be found.

If, for example, only NAND gates exist which have merely two inputs, an implementation may be found wherein merely NAND gates with two inputs are present. If, however, NAND gates or NOR gates having several inputs are present and if, in addition, NOT operations may be implemented in a simple manner, the same truth table may be implemented using a plurality of different links and sub-operations. This flexibility or variability may further be benefited from for finding the most favorable layout in terms of circuit engineering and calculating time, or for using alternating layouts for identical calculating units so as to cause further confusion in potential attackers wanting to compare, for example, several chip cards so as to obtain secret information.

In the most general case, only an operand of the operation which is to be performed by the calculating unit is an encrypted operand, whereas the further operand(s) are clear-text operands. This provides for a certain level of security already in an arithmetical and/or logical operation, since the result of an AND operation between a first parameter a and a second parameter b is already encrypted if only one of the operands, i.e. a or b, is encrypted.

Alternatively, both operands may be encrypted with the same and/or a different encryption algorithm, or with the same encryption algorithm but with different keys.

The inventive calculating unit may further be arranged to perform a multiplexer operation wherein the at least one operand, which is encrypted, is the control signal. The multiplexer having an encrypted control signal may either multiplex non-encrypted input data in an encrypted manner or may multiplex encrypted input data in an encrypted manner. Depending on the size of the multiplexer, the control signal is only one bit wide, i.e. in the case of a 2:1 multiplexer. For larger multiplexers, the control signal will have a width of 2 or several bits. Depending on the security standard desired, each bit of the control signal may be encrypted with a key of its own, or all bits of the control signal may be encrypted with the same key.

BRIEF DESCRIPTION OF THE DRAWINGS

FIG. 1 shows a diagrammatic diagram of an inventive calculating unit;

FIG. 2a shows an implementation of an inventive calculating unit for a bitwise XOR encryption of the operands so as to implement an XOR operation of the ALU;

FIG. 2b shows a truth table for the circuit of FIG. 2a;

FIG. 3a shows an ALU for an inventive calculating unit for implementing an AND operation, the operands being encrypted by means of an XOR operation;

FIG. 3b shows a truth table for the circuit of FIG. 3a;

FIG. 4a shows an ALU for an inventive calculating unit for implementing an OR operation, the operands being encrypted by means of an XOR operation;

FIG. 4b shows a truth table for the circuit of FIG. 4a;

FIG. 5a shows an ALU for an inventive calculating unit for implementing a NOR operation, the operands being encrypted by means of an XOR operation;

FIG. 5b shows a truth table for the circuit of FIG. 5a;

FIG. 6a an ALU for an inventive calculating unit for implementing a NAND operation, the operands being encrypted by means of an XOR operation;

FIG. 6b shows a truth table for the circuit of FIG. 6a;

FIG. 7b shows a truth table for the circuit of FIG. 7a with regard to the carries;

FIG. 11b shows a more detailed representation of the INC/DEC unit of FIG. 11a;

DESCRIPTION OF PREFERRED EMBODIMENTS

Figures 3A, 3B:
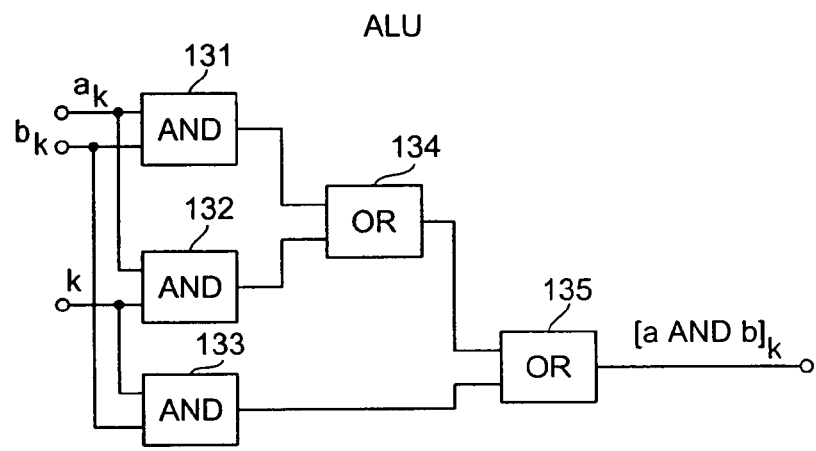

FIG. 1 shows an inventive calculating unit for performing an arithmetic operation on at least two operands, the at least two operands being encrypted operands $a_k$ and $b_k$. The inventive calculating unit includes an arithmetic-logic unit ALU 10 which comprises, in addition to a first input 12 for the first encrypted operand $a_k$, a second input 14 for the second encrypted operand $b_k$. The inventive ALU 10 further comprises a third input 16 for an encryption parameter k as well as an output 18 for outputting an encrypted result of the arithmetic operation OP performed by the ALU 10. The arithmetic-logic unit 10 is implemented to link the first input 12, the second input 14 and the third input 16 for the encryption parameter k, while considering the kind of encryption of the operands $a_k$, $b_k$, using arithmetic sub-operations in such a manner that at the output, an encrypted result is obtained which equals a value that would be obtained if the first operand a was subjected to the arithmetic operation OP in a non-encrypted state and if the second operand b was subjected to the arithmetic operation OP in a non-encrypted state, and if a result obtained was subsequently encrypted as is represented by the square brackets and the index k in FIG. 1. No decryption of the operands $a_k$ and $b_k$ is performed in the arithmetic-logic unit 10, but only such sub-operations which are performed on the encrypted operands $a_k$, $b_k$ and on the encryption parameter k or on the negated encrypted operands or on the negated encryption parameter or on intermediate results of preceding operations take place.

In accordance with the invention an arithmetic-logic unit is described which allows the arithmetic-logic operations to be performed directly with the encrypted data and to output the result in an encrypted form as well. Here it is preferably also ensured that no clear text occurs in any intermediate results. The structure of a processor arrangement operating in a fully encrypted manner is thus achieved in combination with encrypted storing.

The inventive ALU 10 makes it possible to perform all manipulations in a CPU with encrypted data. By means of example only, the basic ALU operations ADD, AND, OR, NOT, NAND, NOR and XOR will be represented with the encrypted data in the following figures. Here, the data on all buses (FIG. 10) as well as in the memories M1 to M3 (FIG. 10) are assumed to be encrypted.

Figure 10:
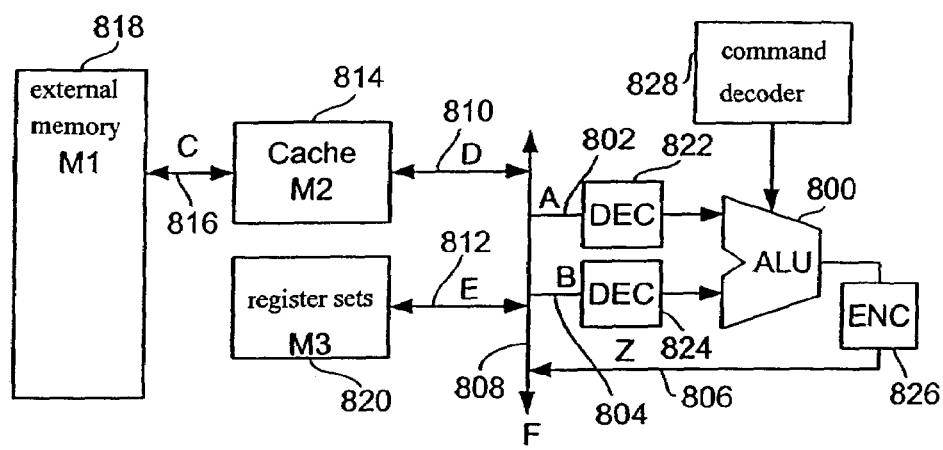
FIG. 10 shows a calculating unit of the prior art with a decryption upstream of the ALU and an encryption downstream of the ALU.

Merely by way of example, a bitwise XOR operation of a preferably temporary key $k_n$ on the data is used as a simple encryption method on the buses A-F of FIG. 10, the encryption method however still being secure due to the possibility of performing frequent key changes. Here, n is the index of the key. The key $k_n$ is preferably temporary and valid only for one or several subsequent operations, for example. Two input buses A, B, that is two input lines 12, 14 of FIG. 1, are required for a minimal CPU. The data on both buses is encrypted bit by bit with the same key $k_n$ for reasons of a simpler representation. However, it is of course also possible to use different keys on both inputs 12, 14 of FIG. 1. In addition, it is not mandatory to use a bitwise encryption, but it would also be possible to encrypt, for example, one in two, one in four, one in six or one in eight bits, whereas the intervening bits are not encrypted. A certain level of security is already achieved by encrypting only one single bit of an operand, or, expressed in general terms, one single location of an operand, while the other locations are not encrypted.

Even though in the following FIGS. 2a to 7b a bitwise XOR encryption with a key $k_n$ is always assumed as the basis, it is self-evident that any other reversible operation, such as, for example, as an XNOR operation, is also suitable as an encryption algorithm. In addition, any further reversible encryption algorithms may be used as encryption algorithms. A precondition is merely to find expressions wherein only the encrypted operands $a_k$, $b_k$ and the encryption parameter k exist in a state in which they have undergone some kind of logical processing, for example are negated or linked or occur generally in a mathematical function, which becomes obvious when observing mathematical laws, such as, for example, the equivalence rules for the arithmetic calculations by analogy with the examples given below.

As has already been explained, a bitwise XOR encryption of the operands a and b is assumed for the following exemplary implementations of an inventive ALU 10 for reasons of simplicity of the representation, the encrypted operands and/or encrypted results being designated by an index k, the encryption parameter being designated by k, and the index n being a counting index for an nth bit of the respective operand and/or key. The encrypted n bits at the input of the inventive calculating unit are calculated as follows:

$$a_{k_n} = a_n \oplus k_n \quad (1a)$$

$$b_{k_n} = b_n \oplus k_n \quad (2a)$$

The reversals (decryption equations) of the equations (1a) and (2a) are as follows:

$$a_n = a_{k_n} \oplus k_n \quad (1b)$$

$$b_n = b_{k_n} \oplus k_n \quad (2b)$$

The following calculation results from this for the XOR operation, that is to say if the ALU is to perform an XOR operation:

$$a_n \oplus b_n \oplus k_n = a_{k_n} \oplus b_{k_n} \oplus k_n \quad (3)$$

The following equation 4 supplies the proof for equation 3.

$$a_n \oplus b_n \oplus k_n = a_n \oplus k_n \oplus k_n \oplus b_n \oplus k_n = a_{k_n} \oplus b_{k_n} \oplus k_n \quad (4)$$

The implementation of equation 3 in terms of circuit engineering is given in FIG. 2a. To provide a result which equals an XOR operation of the non-encrypted operands a, b and which equals a subsequent encryption of the result, the inventive ALU 10 in this case includes, as arithmetic sub-operations, a 3-fold XOR gate 120 which links the encrypted input parameters $a_k$, $b_k$, and k with each other. Thus it can be seen that clear-text parameters a and b are not present at any location of the inventive ALU 10 shown in FIG. 2a.

In the implementation of the 3-fold XOR gate it is ensured that no clear-text data is visible on an internal line. For example, it is prohibitive that two cascaded 2-fold XOR gates are used, since in this case clear-text intermediate results may occur. For implementing the 3-fold XOR gate, a lookup table having the values represented in FIG. 2b for the input parameters $k_n$, $a_{kn}$ and $b_{kn}$ and ($a_n$ XOR $b_n$ XOR $k_n$) as the output parameters is therefore preferred. The table may be implemented as a ROM.

comparison of the ninth column with the seventh column of FIG. 2b confirming the correctness of the link with the arithmetic sub-operations.

In the following, reference is made to FIG. 3a, in which is represented an implementation of an inventive calculating unit with an ALU for the AND operation. FIG. 3b, in turn, depicts the associated truth table. The following equation 5, in turn, depicts the path from the AND operation of the non-encrypted operands a and b, and the subsequent XOR encryption, as it would be implemented by the circuit shown in FIG. 10, to the inventive implementation given, for example, by the last line of equation 5. The AND ALU includes a total of five sub-operations 131 to 135, which are AND operations and OR operations. The truth table in FIG. 3b in turn confirms the correctness of the inventive ALU implementation using several arithmetic sub-operations for linking the encrypted operands and the key. At this point it shall be pointed out that any of the intermediate lines of equation (5) may be implemented in terms of circuit engineering, depending on which gates are available to the circuit designer and depending on which calculating expense is permissible. The implementation in terms of circuit engineering shown in FIG. 3a is assumed to be more efficient in terms of calculating time than the implementation, in terms of circuit engineering, of for example the fourth line of equation (5). However, this implementation could also be used to create confusion in potential attackers, as has already been set forth.

$$(a_n \cdot b_n) \oplus k_n = (a_{k_n} b_{k_n} \overline{k_n} + \overline{a_{k_n}} \cdot \overline{b_{k_n}} k_n) \oplus k_n \quad (5)$$

$$= a_{k_n} b_{k_n} \overline{k_n} + k_n \overline{(a_{k_n} b_{k_n} \overline{k_n} \cdot \overline{a_{k_n}} \cdot \overline{b_{k_n}} k_n)}$$

$$= a_{k_n} b_{k_n} \overline{k_n} + k_n [(\overline{a_{k_n}} + \overline{b_{k_n}} + k_n) \cdot (a_{k_n} + b_{k_n} + \overline{k_n})]$$

$$= a_{k_n} b_{k_n} \overline{k_n} + k_n [a_{k_n} \overline{b_{k_n}} + b_{k_n} \overline{a_{k_n}} + a_{k_n} k_n + b_{k_n} k_n + \overline{a_{k_n}} \cdot \overline{k_n} + b_{\overline{k_n}} \cdot \overline{k_n}]$$

$$= a_{k_n} b_{k_n} \overline{k_n} + a_{k_n} \overline{b_{k_n}} k_n + b_{k_n} \overline{a_{k_n}} k_n + a_{k_n} k_n + b_{k_n} k_n$$

$$= a_{k_n} b_{k_n} \overline{k_n} + a_{k_n} k_n + b_{k_n} k_n$$

$$= a_{k_n} (b_{k_n} \overline{k_n} + k_n) + b_{k_n} (a_{k_n} \overline{k_n} + k_n)$$

$$= a_{k_n} (b_{k_n} + k_n) + b_{k_n} (a_{k_n} + k_n)$$

$$= a_{k_n} b_{k_n} + a_{k_n} k_n + b_{k_n} k_n$$

It shall be pointed out that the implementation for the XOR operation shown in FIG. 2a is merely exemplary. Of course, the expression represented in the middle of equation (4) could also be implemented in terms of circuit engineering. In this case, four XOR gates wired correspondingly would be required. Even though this implementation is expensive in terms of circuit engineering and calculating time, it could nevertheless be selected to confuse potential attackers.

FIG. 2b represents the truth table. The first three columns depict all possible combinations of the key k, the first operand a and the second operand b. Columns No. 4 and No. 5 show the encrypted input operands for all possible bit combinations. Column No. 6 shows the result of the XOR operation for the two non-encrypted operands a and b. The seventh column depicts the result obtained if the outcome of the XOR operation of the non-encrypted operands is re-encrypted, as would be implemented, for example, by the circuit 826 of FIG. 10.

The eighth column of FIG. 2b now depicts the result of the first arithmetic sub-operation 120. The penultimate column of FIG. 2b depicts the result of the second sub-operation 122, the In the following, reference is made, by way of example, to equation (5) to represent the fundamental inventive concept of producing a calculating-unit means by means of a transformation of the clear-text calculating specification into the ciphertext calculating specification. The AND operation is provided as the clear-text calculating specification.

It is further assumed, as is the case in equation (5), that the encrypted operand $a_{kn}$ results from an XOR operation with the key $k_n$ from the non-encrypted operand $a_n$. For simplicity's sake, the same is assumed for the operand $b_n$. $b_{kn}$ thus equals the XORing of the non-encrypted operand $b_n$ with the key $k_n$. In the above example the clear-text calculating specification is: a AND b. The ciphertext calculating specification which results due to the several mathematical sub-operations and in accordance with which the encryptor is implemented, results as follows from the first line of equation (5):

$$a_{kn} = a_n \oplus k_n;\ b_{kn} = b_n \oplus k_n (a_n \cdot b_n) \oplus k_n = [(a_{kn} \oplus k_n) \cdot (b_{kn} \oplus k_n)] \oplus k_n \quad (5a)$$

The non-encrypted operands $a_n$ and $b_n$ were replaced, in equation 5a, by the mathematical combination of the encrypted operand $a_{kn}$ and the key $k_n$, and $b_{kn}$ and the key $k_n$, respectively, this mathematical combination being the reversal of the encryption algorithm. The right-hand side of equation (5a) thus represents the ciphertext calculating specification obtained immediately from the clear-text calculating specification.

If an XOR operation is used as the encryption algorithm, the reversal of the encryption algorithm is, again, an XOR function, that is, it is identical with the encryption algorithm.

To achieve an actual implementation it must now be possible to transform the ciphertext calculating specification of the right-hand side of equation 5a, in which now only encrypted operands and keys exist, in any manner desired. This transformation may be effected by appropriate mathematical laws etc. and is represented herein in the case of an XOR or an XNOR encryption.

It is preferred to use the last line of equation 5, which is obtained from the right-hand side of equation 5a when a plurality of mathematical transformations are carried out, as a basis for an implementation of the processing unit (10 in FIG. 1). It can thus be seen from equation 5a how the clear-text specification for the operation with non-encrypted operands $(a_n \times b_n)$ is transformed into a ciphertext calculating specification with mathematical sub-operations by replacing the non-encrypted operands by means of the combination of encrypted operands and encryption parameters, which mathematical sub-operations may be implemented in any manner desired by mathematical transformations, to be precise on the precondition that no sub-operation comprises, as an input quantity, a clear-text operand for which an encrypted operand exists.

If only one operand is encrypted, the precondition is that the clear-text operand corresponding to the encrypted operand must not be used anywhere as an input quantity for a mathematical sub-operation.

Figures 4A, 4B:
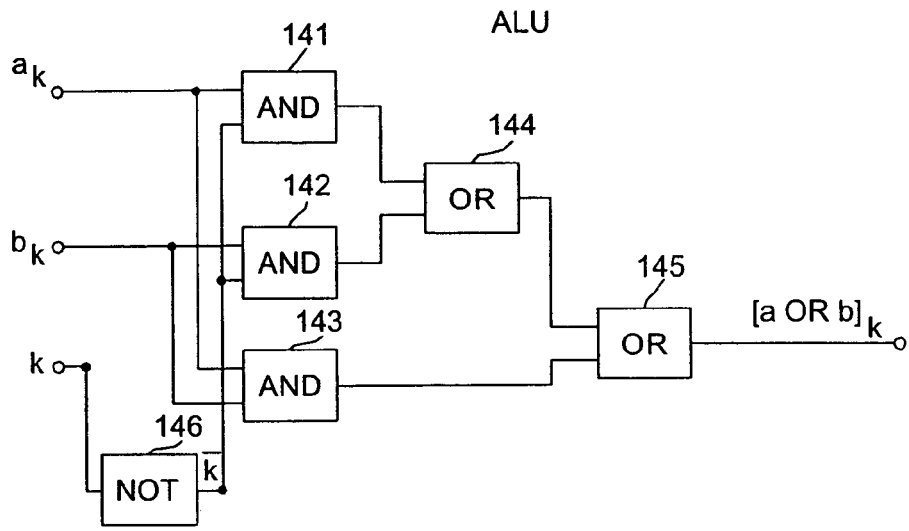

In the following, reference is made to FIG. 4a. FIG. 4a shows the implementation of an ORing of the two operands a and b.

$$(a_n + b_n) \oplus k_n = \overline{a_{k_n}} b_{k_n} \overline{k_n} + a_{k_n} \overline{b_{k_n}} \cdot \overline{k_n} + a_{k_n} b_{k_n} \overline{k_n} + a_{k_n} b_{k_n} k_n \quad (6)$$

$$= a_{k_n} \overline{k_n} + b_{k_n} \overline{k_n} + a_{k_n} b_{k_n} k_n$$

$$= a_{k_n} (\overline{k_n} + b_{k_n} k_n) + b_{k_n} (\overline{k_n} + a_{k_n} k_n)$$

$$= a_{k_n} (\overline{k_n} + b_{k_n}) + b_{k_n} (\overline{k_n} + a_{k_n})$$

$$= a_{k_n} \overline{k_n} + b_{k_n} \overline{k_n} + a_{k_n} b_{k_n}$$

Equation 6 again shows the path that can be followed in order to obtain a plurality of sub-operations starting from the operation using the non-encrypted operands and the subsequent encryption, the plurality of sub-operations being such that they now comprise only the encrypted operands and the encryption parameter. FIG. 4a again shows how the implementation, in terms of circuit engineering, of the disjoint canonical form of the encrypted OR operation using three AND sub-operations 141, 142, 143, two OR sub-operations 144 and 145 as well as a negation and/or NOT operation 146 with the key k is effected in FIG. 3a. As is shown by the various intermediate results in equation (6), the ALU could of course be implemented in various different ways, in this case, for example, a negation of the encrypted first operand $a_k$, of the encrypted second operand $b_k$ and/or of the key k being required.

The truth table of FIG. 4b, in turn, shows the correctness of the implementation, in terms of circuit engineering, of the ALU of FIG. 4a when comparing the seventh column with the eighth column.

In the following, reference is made to FIG. 5a to show the implementation of a NOR operation with encrypted operands. To this end, reference is made to the subsequent equation (7).

$$\overline{(a_n + b_n)} \oplus k_n = \overline{a_{k_n} \cdot b_{k_n} \cdot \overline{k_n} + a_{k_n} \cdot \overline{b_{k_n}} \cdot k_n + a_{k_n} \cdot \overline{b_{k_n}} \cdot k_n +}$$
$$\overline{a_{k_n} \cdot b_{k_n} \cdot k_n} = \overline{a_{k_n} \cdot \overline{b_{k_n}} + \overline{b_{k_n}} \cdot k_n + a_{k_n} \cdot k_n} \quad (7)$$

Figures 5A, 5B:
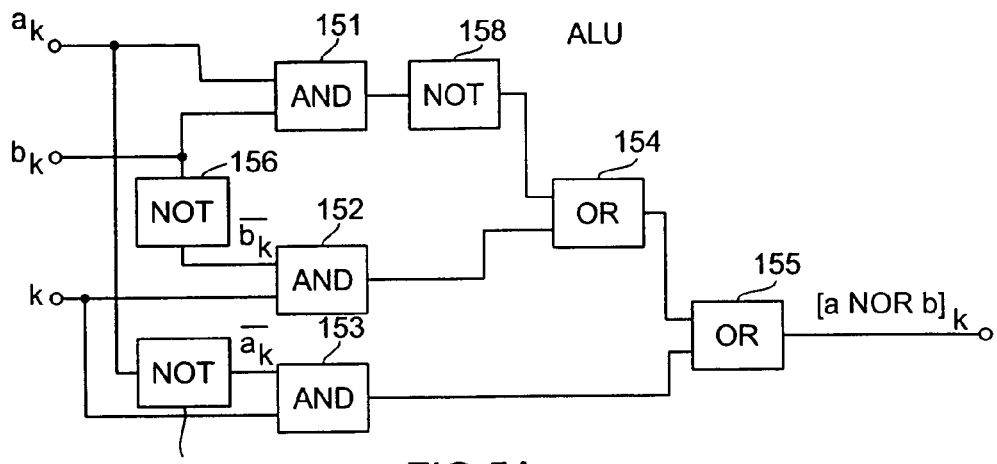

The implementation, in terms of circuit engineering, of equation (7) is again shown in FIG. 5a. AND operations 151 to 153, OR operations 154, 155, and NOT operations 156 and 157, which cooperate and are linked with each other, as is shown in FIG. 5a, are used as arithmetic sub-operations. It shall be pointed out once again at this point that in FIG. 5a, as well as in all other embodiments of the present invention, not only operands $a_k$ and $b_k$ which are encrypted on the input side are present, but also all intermediate results, for example downstream of the gates 151 to 153 are intermediate results from encrypted operands and not from clear-text operands, so that in the inventive calculating unit, no clear-text data will occur at any location, but encrypted data and/or results from encrypted data is present everywhere. The truth table of FIG. 5b and, in particular, the comparison of the seventh column with the eighth column again show the correctness of the implementation of FIG. 5a in terms of circuit engineering. It shall again be pointed out that the intermediate result given in equation (7) could also be implemented in terms of circuit engineering.

In the following, reference shall be made to FIG. 6a to show an inventive implementation of a NAND operation on encrypted operands $a_k$, $b_k$ using the encryption parameter k. Equation (8) again shows the arithmetic for FIG. 6a:

$$\overline{(a_n b_n)} \oplus k_n = \overline{a_{k_n} \cdot b_{k_n} \cdot \overline{k_n} + a_{k_n} \cdot \overline{b_{k_n}} \cdot k_n + a_{k_n} \cdot \overline{b_{k_n}} \cdot \overline{k_n} +}$$
$$\overline{a_{k_n} \cdot b_{k_n} \cdot k_n} = \overline{a_{k_n} \cdot \overline{b_{k_n}} + \overline{b_{k_n}} \cdot \overline{k_n} + a_{k_n} \cdot \overline{k_n}} \quad (8)$$

Figures 6A, 6B:
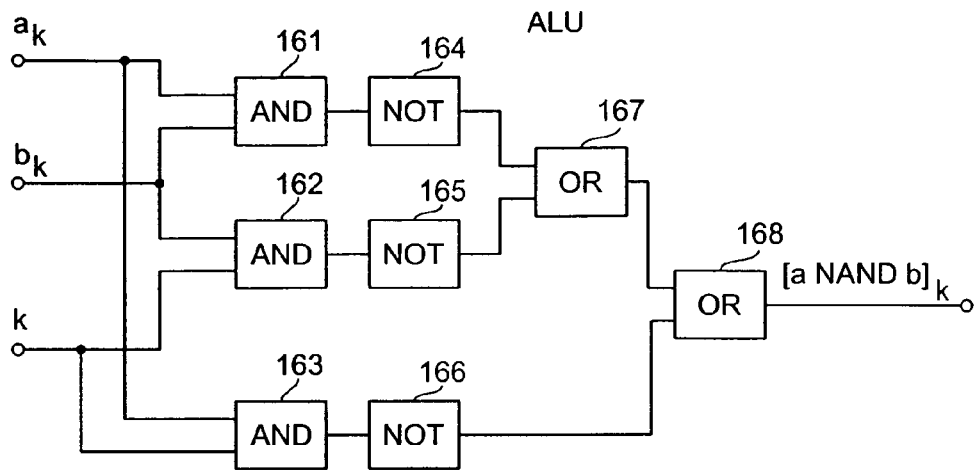

The ALU of FIG. 6a for the inventive calculating unit again includes, as arithmetic sub-operations, three AND operations 161 to 163, three NOT operations 164 to 166 as well as two OR operations 167, 168 which are, as is shown in FIG. 6a, linked with each other and/or with the input operands to provide the encrypted result of a NAND operation between the non-encrypted operands a and b. The truth table in FIG. 6a again emphasizes, when comparing the seventh column with the eighth column, the correctness of the implementation of FIG. 6a.

In the following, reference shall be made to FIG. 7a to show an ADD operation as an example of a three-operands operation between the operands a, b and c. The defining equation therefore shall be the subsequent equation 9

$$s_{k_n} = a_{k_n} \oplus b_{k_n} \oplus c_{k_n} = a_n \oplus k_n \oplus b_n \oplus k_n \oplus c_n \oplus k_n = a_n \oplus b_n \oplus c_n \oplus k_n \quad (9)$$

The operation of three operands and/or of three bits of operands, when considering a bit slice of an adder, leads to a carry c, wherein in the second but last column and the third but last column of the truth table shown in FIG. 7b, the carries in the ADD operation between the non-encrypted operands a, b and c are specified as cp, p standing for "plain"=non-encrypted, and wherein the carry of the ADD operation of the inventive ALU, ck, is shown in the penultimate line. The carry $ckn_{(n+1)}$ results from the equation (10)

$$(c_{kn})_{n+1} = a_{k_n} b_{k_n} + a_{k_n} c_{k_n} + b_{k_n} c_{k_n} \quad (10)$$

Figure 7A:
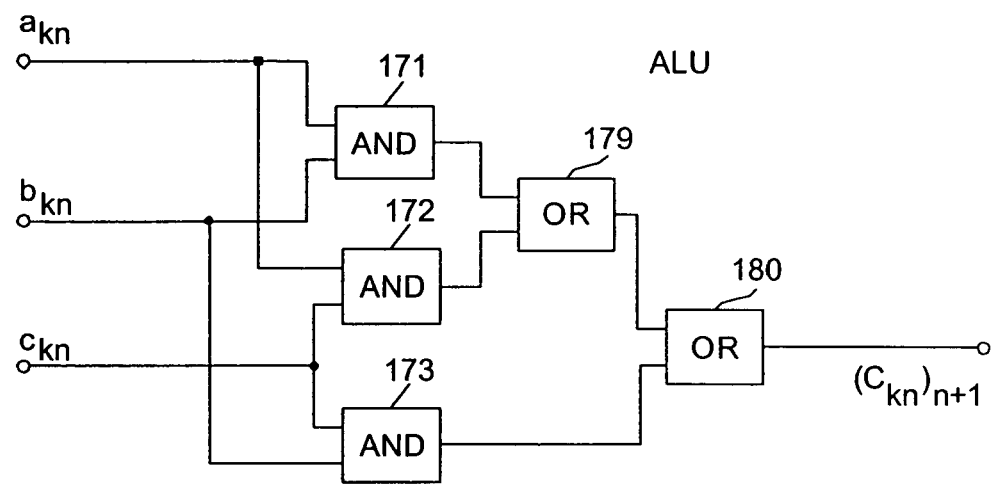
FIG. 7a an ALU for an inventive calculating unit for implementing an ADD operation for three operands, the three operands being encrypted by means of an XOR operation.

The implementation of equation (10) is represented in FIG. 7a. The ALU of FIG. 7a for an inventive calculating unit, in turn, includes a plurality of arithmetic sub-operations, to be precise AND operations 171 to 173 and OR operations 179 and 180. On the output side the carry $(ckn)_{n+1}$ results for the ADD operation of the three input operands, which carry again matches, in accordance with the truth table shown in FIG. 7b, the carry obtained if the three operands are added in a non-encrypted form and are subsequently encrypted. In particular, $(ckn)_{n+1}$ signifies the carry for the next position up ((n+1)th) position (bit slice), encrypted with the key $k_n$, that is with the key of the current position n, that is not encrypted with the key $k_{n+1}$ for the next position up. This means that a re-encryption of $(ckn)_{n+1}$ from the key $k_n$ to the key $k_{n+1}$ will take place depending on the implementation of a bit slice.

The equations (9) and (10) prescribe an implementation for an adder with encrypted operands, which adder outputs an encrypted aggregate bit, or sum bit, s' ($s'=s_{kn}$) and an encrypted carry bit c' ($c'=(ckn)_{n+1}$), the adder obtaining an encrypted carry bit on the input side, in addition to the two encrypted operands. Such an adder is referred to as a one-bit full adder in the art.

Figure 12A:
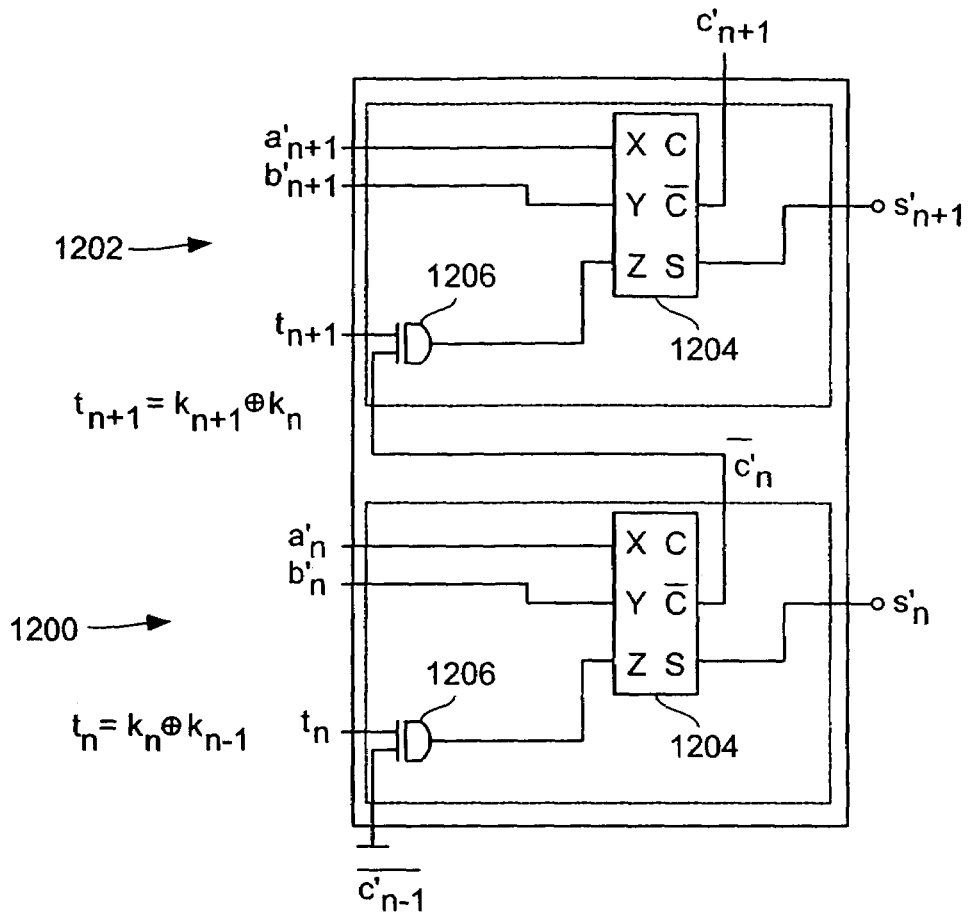
FIG. 12a shows two bit slices of an adder, each bit slice including a 1-bit full adder as the inventive calculating unit.

A one-bit full adder is used to set up an n-bit-wide full adder as the inventive calculating unit. In this case, the one-bit full adder in accordance with an embodiment of the present invention is referred to as a bit slice or a bit slice means. The interconnection of two bit slice means is shown in FIG. 12a. In particular, FIG. 12a shows a first bit slice 1200 for the bit of the order n, and a bit slice 1202 for the bit of the order n+1. The core piece of each bit slice is the calculating unit for encrypted operands, which is referred to as 1204 in FIG. 12a. As has been set forth, any other implementations are possible for an encrypted adder as long as use is made of encrypted input operands and an encrypted carry input to create encrypted output quantities, i.e. encrypted aggregate bits and encrypted carry bits. Depending on the level of security required, use can also be made of a clear-text carry and an encrypted aggregate bit or an encrypted carry bit and a clear-text aggregate bit. In comparison with a fully non-encrypted implementation of the ALU, an improved level of security is already achieved here, even though it is not the highest level of security possible.

The one-bit full adder shown in FIG. 12a is defined by the following two defining equations:

$$s = \bar{x} \oplus \bar{y} \oplus \bar{z} \quad (11)$$

$$c = \bar{x} \cdot \bar{y} + z \cdot \bar{x} + z \cdot \bar{y} \quad (12)$$

Here the adder equations are selected such that no encryption key must be input into the one-bit full adder 1204 itself, but must be input into the bit slice 1202 or 1200 in accordance with an embodiment of the present invention. In addition, the one-bit full adder 1204 is arranged such that, for an adder function, the encrypted carry bit c' itself is not forwarded to the next bit slice means up, but the inverted encrypted carry bit is forwarded. The current bit of the encrypted operand a, that is $a'_{n+1}$, is input into the first input x of the one-bit full adder of the bit slice for the bit n+1. The current encrypted bit of the second operand, that is $b'_{n+1}$, is input into the second input y. A bit which depends on the carry output bit $c'_n$ of the preceding bit slice 1200 is input into the third input z.

It shall be noted that the carry output bit of the preceding bit slice may not be used directly since different encryption keys $k_{n+1}$ and $k_n$, respectively, are present for the two different bit slice means 1200 and 1202. This is why a re-encryption of the carry output bit of the preceding bit slice means from the encryption key $k_n$ for the preceding bit slice means into the encryption key $k_{n+1}$ of the current bit slice means must be carried out.

In the event of an encryption by means of an XOR operation, a re-encryption may be achieved simply by XORing the encrypted carry output bit of the bit slice 1200 with a re-encryption key $t_{n+1}$. This is represented by an XOR gate 1206.

The re-encryption key $t_{n+1}$ is calculated, in accordance with its definition, by the XORing of the two keys concerned for the two bit slices, that is by XORing $k_{n+1}$ for the bit slice 1202, and $k_n$ for the bit slice 1200.

The bit slice means 1202 again outputs a carry output bit, which is, however, encrypted with the key $k_{n+1}$ and must be re-encrypted accordingly by the next stage up (not shown in FIG. 12a). The same applies to the carry input of the bit slice 1200. Here, a carry output bit of the next stages down, n−1, is obtained, this bit having to be re-encrypted by the re-encryption XOR gate 1206.

If several bit slices are connected in series, as is shown in FIG. 12a, the result is generally a ripple carry adder (FIG. 12b) which obtains the two encrypted operands a', b' as well as the re-encryption keys for the individual bits $t_i$ as the input quantities. The ripple carry adder, which is represented in FIG. 12b, further obtains, as an input signal, a carry input signal set to 0 for a common ripple carry adder operating in an adder mode.

It is obvious that a 1 may be applied instead of a 0, as shall be explained for the carry select adder explained below. On the output side, the adder of FIG. 12b provides the aggregate bits in an encrypted form, to be precise $s_0'$, $S_1'$ to $s_N'$. In addition, the adder shown in FIG. 12b provides, as an output signal, a carry bit of the highest bit slice within the adder, if such a carry bit is produced.

Figure 12B:
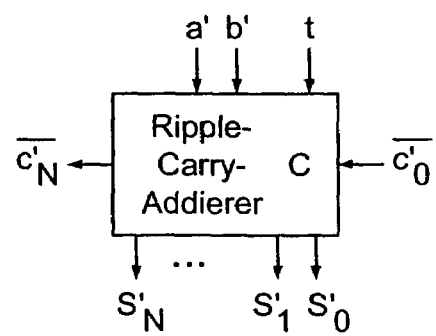
FIG. 12b shows a fundamental block diagram of a ripple carry adder for encrypted data.
Figure 13:
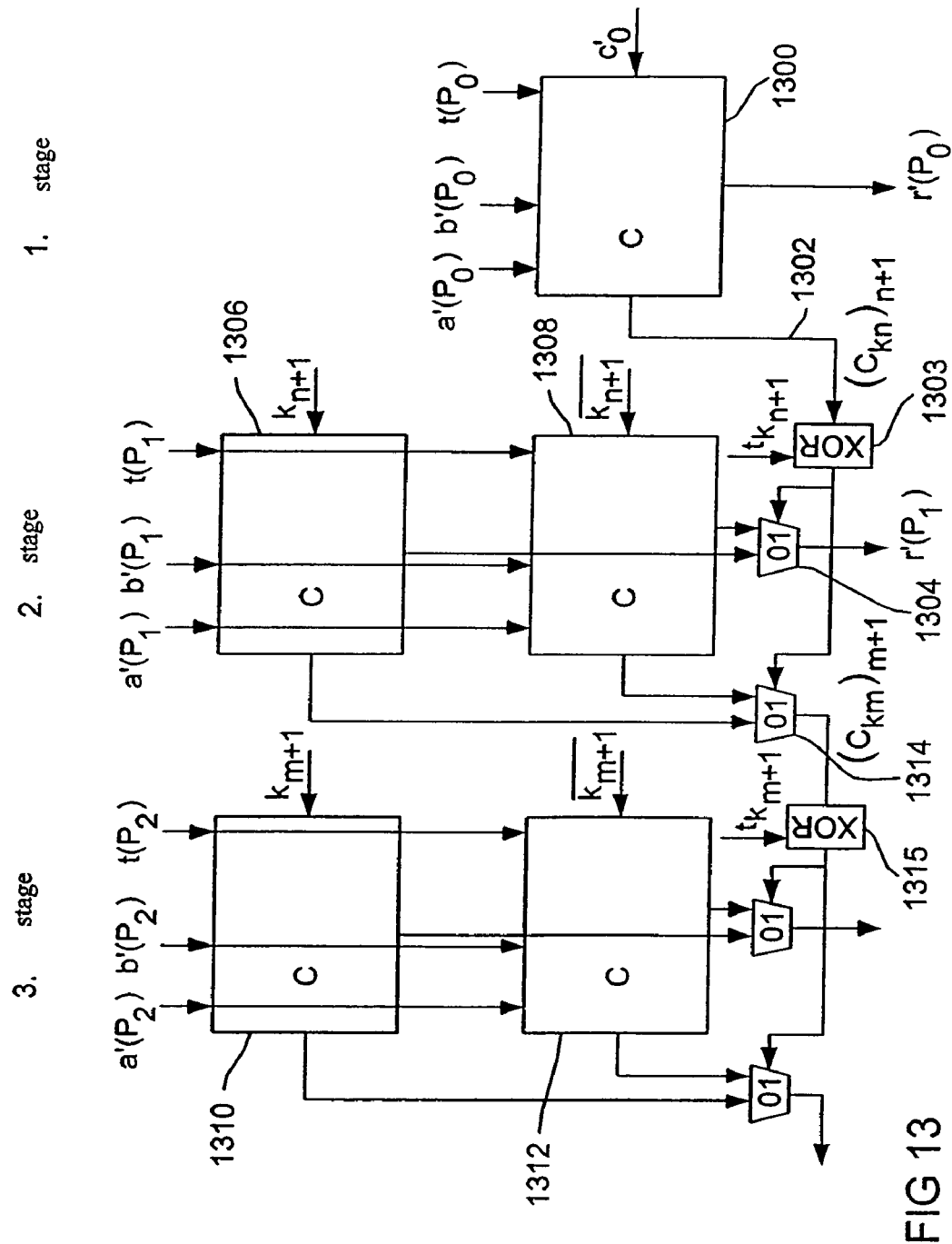
FIG. 13 shows a block diagram of a carry select adder for encrypted data with a carry selection in the ciphertext area.

A carry select adder for encrypted data may be built, as is shown in FIG. 13, from a ripple carry adder for encrypted data, as is shown in FIG. 12b and FIG. 12a, respectively. Carry select adders operate faster than simple ripple carry adders and are described in "Computer Architecture a Quantitative Approach", Second Edition, Hennessy and Patterson, Morgan Kaufmann Publishers, Inc., 1996, appendix A. The known carry select adders, which are described in the above-cited literature, however, work only for non-encrypted operands and provide non-encrypted results.

In the following, the inventive carry select adder for encrypted operands, which provides encrypted output signals, will be described with reference to FIG. 13. Initially, a first ripple carry adder 1300 is provided which is built of several bit slices, as have been described with reference to FIG. 12a. In particular, the first adder 1300 contains a plurality of bit slice means for adding the encrypted bits of the operands a', b' from a least significant bit of the operands to a first boundary bit of the operands. On the output side, the first ripple carry adder 1300 provides encrypted aggregate bits r' for all bits of the operands from the least significant bit to the first boundary bit.

The carry output signal of the bit slice in the adder 1300 for the first boundary bit is output by means of a line 302, is re-encrypted by means of a transformation key $T_{kn+1}$ (re-encryptor 1303) and is fed to a select means 1304 in the form of a multiplexer. The carry select adder further includes a second adder 1306 as well as a third adder 1308, which typically are internally structured just like the first adder 1300 and as any further adders 1310 and 1312 that may be present. For re-encrypting the output carry bits one further re-encryptor (e.g. 1315) is present in each case between the multiplexer output of the preceding stage and the input "1" of the multiplexer of the next stage.

The least significant bit slices of the second adder 1306 and of the third adder 1308 are supplied, at their carry input, with NOT($k_{n+1}$) and with $k_{n+1}$, respectively (or for the third adder with NOT($k_{m+1}$) and with $k_{m+1}$, respectively).

The selection of the aggregate bits that are calculated by the adder 1306 and the adder 1308 (the "select" function) takes places depending on whether a 0 or a 1 has been produced at the carry output 1302 of the first adder after the re-encryption. If a 0 has been produced, the result bits of the second adder 1306 are selected as result bits r'. If, however, a 1 was present after the re-encryption, the result bits of the adder 1308 are selected as result bits r'. If the carry select adder comprises further stages, as is shown in FIG. 13, a selection of the correct carry signal of the second stage will take place using a carry select means 1314. In particular, the carry output signal which is selected is that carry output signal of the adder of the second stage, the result bits, i.e. aggregate bits, of which have been selected as the result r'.

It shall be noted that the actual "carry select" selection is performed on the line 1302 with an encrypted carry bit. There are therefore no clear-text bits occurring. This is because the bits NOT($k_{n+1}$) as well as $k_{n+1}$, and NOT($k_{m+1}$) as well as $k_{m+1}$, respectively, which are input into the two adders of the second and third stages, respectively, are also considered as encrypted bits, so to speak, and are fed, when viewing FIG. 12a, into the XOR gate 1206 of the least significant bit slice of the respective adder and are thus subjected to a "re-encryption" to be encrypted with the key of the actual encryptor. Even though FIG. 13 merely shows that the encryption keys t are fed into the adders, it shall be noted that the operation for calculating the re-encryption key could also be performed within the bit slices of the adder. In this case, the individual encryption parameters $k_i$ for the respective bits would have to be input into the adders, and the XORing of the encryption parameters of two adjacent bit slices would be performed within the adders. For reasons of speed, however, it is preferred to calculate the encryption parameters outside of the bit slices.

Finally, it shall be noted that instead of the one-bit full adder 1204, as has already been set forth, any other means may be used for performing a one-bit full addition, the means having to be able to perform a calculation with encrypted operands and to output an encrypted result bit and/or an encrypted carry bit without the necessity of producing clear-text intermediate results.

Figure 8A:
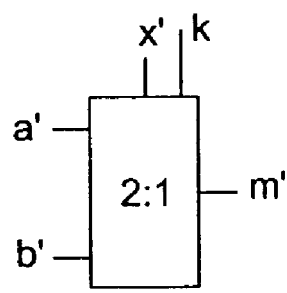
FIG. 8a shows a block diagram of a 2:1 multiplexer with an encrypted control signal.

In the following, a further embodiment of the inventive calculating unit shall be explained with reference to FIGS. 8a to 8d, wherein the operation to be performed on several operands is a multiplexer operation. If, for example, as is shown in FIG. 8a, two input operands a', b' are obtained, the apostrophe "'" standing for encrypted values, the operation on the input operands consists in either passing a' to the output, that is a' becoming the signal m', and not passing on b', or, alternatively, in b' becoming the output signal m', and not passing on the other input signal a'.

The selection is based on the encrypted control signal x' encrypted with the encryption parameter k.

The inventive calculating unit could of course also multiplex non-encrypted operands a, b using the encrypted control signal x'.

The defining equation and/or clear-text calculating specification for the 2:1 multiplexer operation with non-encrypted operands is as follows:

$$m = b \cdot \overline{x} + a \cdot x \quad (13)$$

By analogy therewith, the definition equation and/or clear-text calculating specification for the 3:1 multiplexer operation for non-encrypted operands is as follows:

$$m = c \cdot \overline{x} \cdot y + b \cdot x \cdot \overline{y} + a \cdot x \cdot y + a \cdot \overline{x} \cdot \overline{y} \quad (14)$$

For the 4:1 multiplexer in FIG. 8c, the clear-text calculating specification for the multiplexer operation with non-encrypted operands is as follows:

$$m = d \cdot x \cdot y + c \cdot \overline{x} \cdot y + b \cdot x \cdot \overline{y} + a \cdot \overline{x} \cdot \overline{y} \quad (15)$$

The ciphertext calculating specification for the encrypted multiplexer operation is now obtained from the clear-text calculating specification by replacing the control signal in the equations 11 to 13 by the combination of an encrypted control signal and an encryption parameter.

In the present example, the encryption algorithm is an XOR operation with a key. The mathematical combination of the encrypted control signal and the encryption parameter, which is the reversal of the encryption algorithm, is thus also the XOR operation—again. Inserting x' XOR k into equation 11 leads to the following ciphertext calculating specification for the encrypted 2:1 multiplexer, several transformations having already been performed so as to indicate a preferred implementation of the processing unit:

$$2:1 MUX : m' = b' \cdot x' \cdot k + a' \cdot \overline{x}' \cdot k + a' \cdot x' \cdot \overline{k} + b' \cdot \overline{x}' \cdot \overline{k} \quad (16)$$

Figure 8B:
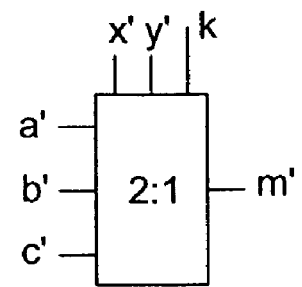
FIG. 8b shows a block diagram of a 3:1 multiplexer with an encrypted control signal.

The multiplexer shown in FIG. 8b is a 3:1 multiplexer wherein the control signal comprises 2 bits x, y. For simplicity's sake it shall be assumed that the two control signal bits x, y are encrypted with the same key to obtain encrypted control bits x' and y'. By inserting x' XOR k and y' XOR k, respectively, into the defining equation (12) for the non-encrypted operands for the 3:1 multiplexer, the following ciphertext calculating specification for the 3:1 multiplexer is obtained, the ciphertext calculating specification already having been transformed so as to be directly implemented by the processing unit:

$$3:1 MUX : m' = c' \cdot x' \cdot \overline{y}' \cdot k + b' \cdot \overline{x}' \cdot y' \cdot k + \quad (17)$$
$$c' \cdot \overline{x}' \cdot y' \cdot \overline{k} + b' \cdot x' \cdot \overline{y}' \cdot \overline{k} + a' \cdot x' \cdot y' + a' \cdot \overline{x}' \cdot \overline{y}'$$

Figure 8C:
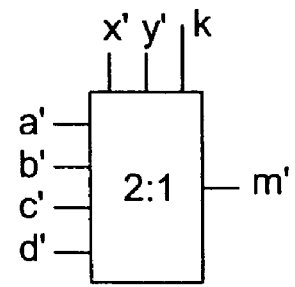
FIG. 8c shows a block diagram of a 4:1 multiplexer with an encrypted control signal.

An analogous approach leads to the following ciphertext calculating specification for the 4:1 multiplexer shown in FIG. 8c, this ciphertext calculating specification being comprised of many mathematical sub-operations, as is set forth in equation (18):

$$4:1 MUX : m' = \quad (18)$$
$$d' \cdot \overline{x}' \cdot \overline{y}' \cdot k + c' \cdot x' \cdot \overline{y}' \cdot k + b' \cdot \overline{x}' \cdot y' \cdot k + a' \cdot x' \cdot y' \cdot k +$$
$$d' \cdot x' \cdot y' \cdot \overline{k} + c' \cdot \overline{x}' \cdot y' \cdot \overline{k} + b' \cdot x' \cdot \overline{y}' \cdot \overline{k} + a' \cdot \overline{x}' \cdot \overline{y}' \cdot \overline{k}$$

Figure 8D:
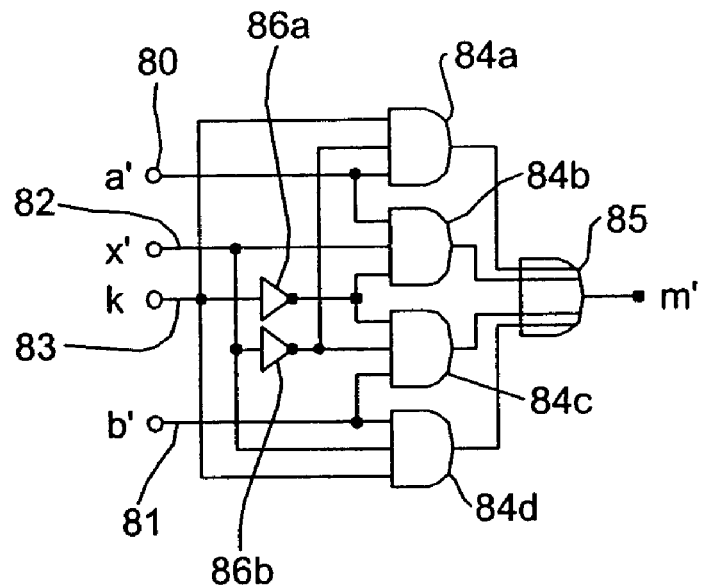
FIG. 8d shows an example of an implementation of the 2:1 multiplexer with the encrypted control signal.

In the following, an implementation, in terms of circuit engineering, of the calculating specification given in equation (14) shall be given with reference to FIG. 8d, use being made merely of the AND operation, the OR operation and the NOT operation as mathematical sub-operations:

The circuit for an encrypted multiplexer which is shown in FIG. 8d includes two inputs 80, 81 for the data streams a', b' which are encrypted and which are to be multiplexed. The inventive multiplexer processing unit shown in FIG. 8d further includes an input 82 for the encrypted control signal as well as an input 83 for the encryption parameter k. As is given by equation (16), the circuit 4 includes AND gates 84a, 84b, 84c, 84d as well as an OR gate 85 as well as two inverters 86a, 86b so as to create the negated version of the encrypted control signal and the negated version of the encryption parameter, respectively, which are required in equation (16). For those skilled in the art it is immediately evident that FIG. 8d is a direct implementation, in terms of circuit engineering, of equation (16). By transforming equation (16) in any way desired by appropriate mathematical laws, any other implementations desired may be found for the processing unit by analogy with FIG. 8d.

All these different implementations have in common that they implement the calculating specification given in equation (16) for the 2:1 multiplexer, the calculating specification consisting of a plurality of mathematical sub-operations (84a-84d, 85, 86a, 86b) which include, as input quantities, merely the encrypted control signal and the encryption parameter, but not the clear-text control signal.

It shall be pointed out that multiplexers represent a basic and often indispensable element in many electronic circuits.

Different implementation variants exist for n-to-1-multiplexers, which are optimized depending on speed, area or technology. Thanks to the inventive concept, possibilities of carrying out an attack, in particular probing by means of pins, and side-channel attacks such as DPA (differential power analysis) or SPA (simple power analysis) are considerably restricted. As has been set forth, the principle of the one-time pad is used as the encryption technique. All N input signals $a_i$ (i=2, . . . , N), i.e. the data to be multiplexed, as well as the control lines $x_n$ (n=1 . . . [$\log_2 N$]; the operation [x] refers to the smallest integer larger than x) are present in an encrypted form. For encrypting, a bitwise modulo-2 addition in accordance with the Vernam cipher is preferably used with a continuously changing key $k_t$, which corresponds to the XOR operation. The result of the operation is immediately generated in the ciphertext space, without ever producing an intermediate result in the clear-text space. A stream of independent and equally distributed random bits for the keys then leads to a fully stochastic current profile and a stochastic bit pattern of the result. SPA and DPA attacks are thereby made considerably more difficult. The increase in complexity/run time due to the multiplexer implementation, for example when comparing equation (16) with equation (13), is not significant in relation to the increase in security.

In order to provide a multiplexer with n-bit-wide inputs to an n-bit-wide output, the circuit shown in FIG. 8d must be repeated, for example, for each bit for the 2:1 multiplexer. FIG. 8d thus shows a bit slice for a multiplexer with input signals wider than 1 bit.

In the above, in particular those calculating unit implementations in which both operands a, b to be linked by an operation are encrypted with the same key k, were described with reference to FIG. 1 to 7b. It is further assumed that the result is also encrypted with this key, as is represented by the defining equations and/or calculating specifications, for example equations 5 and 5a. Here, a feasible target of attack might be the key generator of a cryptography processor. By simultaneously intercepting the key sequence as well as the encrypted output data stream, an attacker might possibly be able to infer a clear-text result. The expense for this attack is admittedly high, since, for example in the case of a 32-bit CPU, 64 bits would have to be observed at the same time in order to achieve full decryption. In order to nevertheless eliminate this localized point of attack in the form of the key generator, which could also be deactivated by an attacker, it is preferred, for certain cases in which particularly high security standards are required, to use several different encryption algorithms, or to use the same encryption algorithm, but different encryption keys. This again significantly increases the expanse required for carrying out a successful attack.

The operands for the operation are no longer encrypted with the same key k, as is shown, for example, with reference to FIG. 2a, but the operands are encrypted with different keys.

Here it is preferred to use a distinct key for each operand, to be precise key i for the operand a, key j for the operand b. It is further preferred to encrypt the result of the operation with a further key which shall be referred to as k here. The key k, with which the result of the operation is encrypted, could be selected independent of i and j. It is preferred, however, to use the key k as an XOR operation of the keys i and j.

An advantage of this method is the fact that intercepting an individual key stream is no longer sufficient for being able to reconstruct the output data stream of the operation. The attack threshold is thus raised further, whereas the outlay in terms of hardware is increased only slightly. The use of several independent key generators further increases the security against cryptoanalysis, since real key generators cannot generate any independent and equally distributed random keys. In addition, security is also increased by the fact that the encryption will not fail completely in a physical attack deactivating a key generator.

Figure 9A:
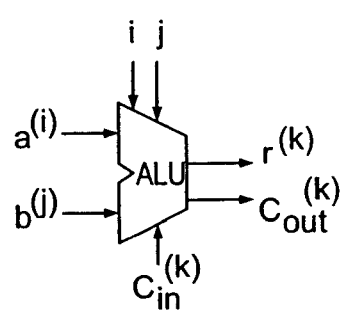
FIG. 9a to 9c show block diagrams of an inventive calculating unit implemented as an adder, wherein the operands are encrypted with different keys and wherein the carries are encrypted differently.
Figure 9B:
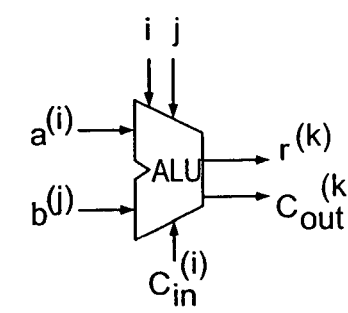
Figure 9C:
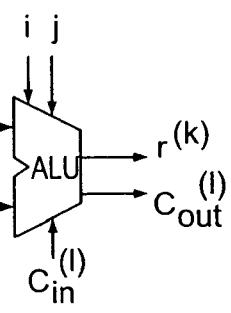

FIGS. 9a to 9c show three variants for an inventive calculating unit (ALU) acting as an adder of the input operands a, b, and having an additional carry input $C_{in}$, a sum output r and a carry output $c_{out}$. In its form shown in FIG. 9a to 9c, the inventive calculating unit further comprises i, j for the different encryption parameters inputs i, j for the different keys of the operands a and b, respectively.

The calculating units shown in FIG. 9a to 9c, also referred to as 1-bit full adder and operating, in principle, in the manner as has been set forth with reference to FIGS. 7a and 7b, do not comprise an input for the output key k since same is given, by definition, by the XORing of the keys i and j. This has the advantage that the key k which would be required for decrypting the result r does not occur explicitly and can therefore not be intercepted explicitly.

In FIG. 9a, the carry input $c_{in}$ further is encrypted with the key k, whereas the carry output $c_{out}$ is also encrypted with the key k. In FIG. 9b, the carry input $c_{in}$ is encrypted with the same key as the operand a, that is with i, whereas the carry output is encrypted with the key k. In FIG. 9c, yet another variant is represented, wherein the carry input is encrypted with a further key l, and wherein the carry output is also encrypted with this same further key l. Even though not represented, a variant with a non-encrypted carry input or a non-encrypted carry output is also possible.

The following encryption equations apply to all keys:

$$a^{(i)} = a \text{ XOR } i \qquad (19)$$
$$b^{(j)} = b \text{ XOR } j$$
$$r^{(k)} = r \text{ XOR } k$$
$$c_{in}^{(k)} = c_{in} \text{ XOR } k$$
$$c_{out}^{(l)} = c_{out} \text{ XOR } l$$

The reversals of the encryption equations of equation (19) are identical, since, as has been set forth several times, the reversal of the XOR function is again the XOR function.

In the following, an overview is given of the logical operations as well as the adder functions SUM (aggregate bit) and carry (carry bit) for the versions of FIG. 9a to 9c:

Inputs: operands $a^{(i)}$, $b^{(j)}$ as well as carry-in $C_{in}^{(k)}$ (variant a) and/or $c_{in}^{(l)}$ (variant b)

Auxiliary variable: $k=i \oplus j$, $a'=a^{(i)} \oplus j$, $b'=b^{(j)} \oplus i$, Logical operations:

Clear-text calculating   Ciphertext calculating
specification            specification OR: $r^{(k)} \leftarrow (a+b)^{(k)} = (a'+b') \cdot \bar{k} + a' \cdot b'$ AND: $r^{(k)} \leftarrow (a \cdot b)^{(k)} = (a'+b') \cdot k + a' \cdot b'$ NOR: $r^{(k)} \leftarrow \overline{(a+b)}^{(k)} = \overline{a'+b'} + \overline{a'+b'} \cdot k$ NAND: $r^{(k)} \leftarrow \overline{(a \cdot b)}^{(k)} = \overline{a'+b'} + \overline{a'+b'} \cdot \bar{k}$ XOR: $r^{(k)} \leftarrow (a \oplus b)^{(k)} = (a' \oplus b') k$ XNOR: $r^{(k)} \leftarrow \overline{(a \oplus b)}^{(k)} = (a' \oplus b') \oplus \bar{k}$ Variant FIG. 9a: Full adder with sum and carry-out:
Auxiliary variables: $a'=a^{(i)} \oplus j$, $b'=b^{(j)} \oplus i$, $c'=c_{in}^{(k)}$ SUM: $r^{(k)} \leftarrow a' \oplus b' \oplus c'$ CARRY: $c_{out}^{(k)} \leftarrow a' \cdot b' + a' \cdot c' + b' \cdot c'$ Variant FIG. 9b: Full adder with sum and carry-out:
Auxiliary variables: $a'=a^{(i)} \oplus j$, $b'=b^{(j)} \oplus i$, $c''=c_{in}^{(l)}$ SUM: $r^{(k)} \leftarrow a^{(i)} \oplus b' \oplus c''$ CARRY: $c_{out}^{(k)} \leftarrow (a^{(i)} \oplus c'') \cdot b' + \overline{a^{(i)} \cdot \bar{c''}} \cdot \bar{j} + a^{(i)} \cdot c'' \cdot \bar{j}$ Variant FIG. 9c: Full adder with sum and carry-out:
Auxiliary variables: $a'=a^{(i)} \oplus j \oplus l$, $b'=b^{(j)} \oplus i \oplus l$, $c'=C_{in}^{(l)} \oplus k$ SUM: $r^{(k)} \leftarrow a' \oplus b' \oplus c_{in}^{(l)}$ CARRY: $c_{out}^{(l)} \leftarrow (a' \cdot b' + a' \cdot c' + b' \cdot c') \oplus k$ In the following, those canonical forms of the above ciphertext calculating specifications are indicated which may be implemented directly by the processing unit and which include merely mathematical sub-operations having no cleartext data as input operands. For the full adder (SUM, carry), only the calculating specification for the variant of FIG. 9a is given below. This calculating specification has the advantage that the key k does not explicitly occur anywhere and therefore cannot be intercepted.

AND: $r^{(k)} \leftarrow a^{(i)} \cdot b^{(j)} \cdot \bar{j} + \bar{a}^{(i)} \cdot \bar{b}^{(j)} \cdot j + b^{(j)} \cdot \bar{i} \cdot j + \bar{b}^{(j)} \cdot i \cdot j$ (20)

OR: $r^{(k)} \leftarrow a^{(i)} \cdot \bar{b}^{(j)} \cdot \bar{j} + \bar{a}^{(i)} \cdot b^{(j)} \cdot j + b^{(j)} \cdot \bar{i} \cdot \bar{j} + \bar{b}^{(j)} \cdot i \cdot j$ (21)

NAND: $r^{(k)} \leftarrow \bar{a}^{(i)} \cdot b^{(j)} \cdot \bar{j} + a^{(i)} \cdot \bar{b}^{(j)} \cdot j + b^{(j)} \cdot i \cdot j + \bar{b}^{(j)} \cdot \bar{i} \cdot \bar{j}$ (22)

NOR: $r^{(k)} \leftarrow \bar{a}^{(i)} \cdot \bar{b}^{(j)} \cdot \bar{j} + a^{(i)} \cdot b^{(j)} \cdot j + b^{(j)} \cdot i \cdot \bar{j} + \bar{b}^{(j)} \cdot \bar{i} \cdot j$ (23)

XOR: $r^{(k)} \leftarrow a^{(i)} \oplus b^{(j)}$ (24)

XNOR: $r^{(k)} \leftarrow \overline{a^{(i)} \oplus b^{(j)}}$ (25)

SUM: $r^{(k)} \leftarrow (a^{(i)} \oplus j) \oplus (b^{(j)} \oplus i) \oplus c_{in}^{(k)}$ (26)

CARRY: $r^{(k)} \leftarrow (a^{(i)} \oplus j) \cdot (b^{(j)} \oplus i) + (a^{(i)} \oplus j) \cdot c_{in}^{(k)} + (b^{(j)} \oplus i) \cdot c_{in}^{(k)}$ (27)

An implementation of the processing unit may be readily derived by those skilled in the art from equations (20) to (27), the only mathematical sub-operations used here which together result in the calculating specification being an AND operation, a NOT operation, an OR operation, and an XOR operation.

It shall further be noted that the key k, with which the result r is encrypted, equals the XORing of i and j. Therefore, the processing unit of the inventive calculating unit does not have an explicit input for the key k.

Figure 11A:
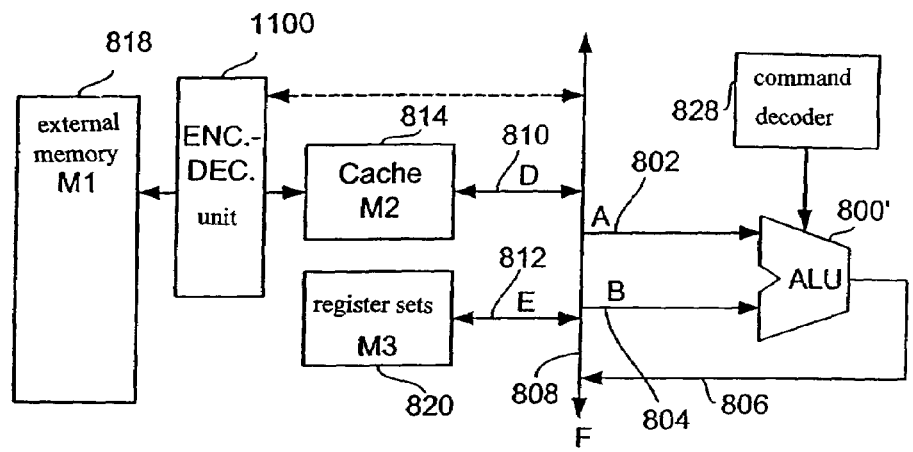
FIG. 11a shows a block diagram of an inventive cryptoprocessor having an inventive calculating unit.

FIG. 11a shows a block diagram of an inventive cryptography processor which does not comprise any operand decryption (block 822 and block 824 upstream of the ALU 800) and no result encryption (block 826 downstream of the ALU 800) as opposed to the "insecure" cryptography processor shown in FIG. 10. The ALU 800' is a calculating unit for at least one encrypted operand for performing a multiplexer operation, a logic operation in accordance with a logic basic operation, a 1-bit full adder function or a carry select addition algorithm etc., as has been explained above or will be explained below.

The cryptography processor shown in FIG. 11a includes an encryptor/decryptor 1100 arranged between the external memory 818 and the cache 814 or, if no cache is provided, between the external memory 818 and the bus 808.

It is preferred, in accordance with the invention, to encrypt the data in the memory with a first encryption algorithm, whereas the data transmitted on the bus 808 or stored in the cache 814 is encrypted with a second encryption algorithm. The first and second encryption algorithms preferably differ from each other in that the encryption algorithm with which the data arranged in the external memory 818 is encrypted is a so-called "hard" encryption algorithm, such as, for example, an expensive cryptoalgorithm in the form of, for example, the DES algorithm or the AES algorithm. The second encryption algorithm, with which the data led into the inventive calculating unit 800' is encrypted, is preferably a "soft" encryption algorithm that is inexpensive. For example, the bitwise XOR operation with a key is such a soft encryption algorithm. Whereas the key for the hard encryption algorithm is never or rarely changed, the key of the soft encryption algorithm is changed often, or even with each encryption, to achieve a high level of security also for the soft encryption algorithm.

Figure 11B:
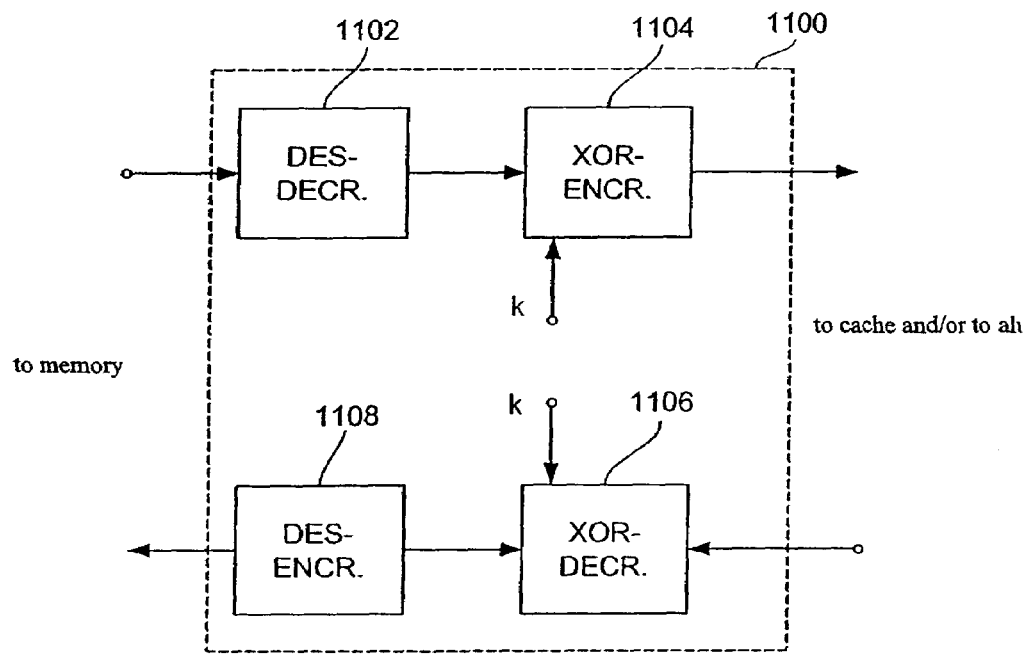

FIG. 11b shows a more detailed representation of the block 1100 of FIG. 11a. On the data forward path from the memory 818 to the bus 808 or to the cache 814, a DES decryptor 1102 is initially arranged, followed by an XOR encryptor 1104. By analogy therewith, on the data return path, an XOR decryptor 1106 is initially arranged, followed by a DES encryptor 1108. Thus the data which is stored in the form of a hard encryption in the memory 818 is initially decrypted and thereafter encrypted with the second (soft) encryption algorithm to be fed into the ALU 800' for encrypted data. The results from the ALU, if they are to be stored in the external memory 818, are initially decrypted in accordance with the soft encryption algorithm (block 1106) and subsequently encrypted in accordance with the hard encryption algorithm (block 1108).

This procedure ensures that no non-encrypted data is transported anywhere via a bus in a cryptography processor. The only locations where non-encrypted data is present are situated between the means 1102 and 1104, and 1106 and 1108, respectively. However, this is not a communication bus which may be recognized and may further be intercepted with limited expense due to its widely extended structures.

According to the invention, the two-stage encryption is preferred, since for data present in the external memory, a high level of security is required which may only be achieved with a hard encryption algorithm. However, this hard encryption algorithm would lead to a very expensive circuit, if an ALU is to be designed for this hard encryption algorithm, and it would therefore result in very pronounced speed losses. It is therefore preferred to perform a translation of the data from the hard encryption algorithm to the soft encryption algorithm so that the ALU structure remains manageable and has a reasonable calculating speed despite the operation on encrypted data.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF REFERENCE NUMERALS

Calculating Unit and Method for Performing an Arithmetic Operation with Encrypted Operands
10 arithmetic-logic unit
12 first input
14 second input
16 third input
18 output
80 input for the first input signal
81 input for the second input signal
82 input for the encrypted control signal
83 input for the encryption parameter
84a-84d AND gate
85 OR gate
86a, 86b NOT gate
120 XOR gate
131 AND gate
132 AND gate
133 AND gate
134 OR gate
135 OR gate
141 AND gate
142 AND gate
143 AND gate
144 OR gate
145 OR gate
146 NOT gate
151 AND gate
152 AND gate
153 AND gate
154 OR gate
155 OR gate
156 NOT gate
157 NOT gate
161 AND gate
162 AND gate
163 AND gate
164 NOT gate
165 NOT gate
166 NOT gate
167 OR gate
168 OR gate
171 AND gate
172 AND gate
173 AND gate
179 OR gate
180 OR gate
800 ALU
802 first bus
804 second bus
806 output bus
808 central bus
810 first memory bus
812 second memory bus
814 cache
816 third memory bus
818 external memory
820 register sets
822 first decryptor
824 second decryptor
826 encryptor
828 command decoder
1100 encryptor/decryptor
1102 DES decryptor
1104 XOR encryptor
1106 XOR decryptor
1108 DES encryptor
1200 bit slice for bit n
1202 bit slice for bit n+1
1204 1-bit full adder for encrypted data
1206 re-encryptor
1300 first ripple carry adder
1302 line for carry output signal
1303 re-encryptor
1304 select means
1306 second adder
1308 third adder
1310 further adder
1312 further adder
1314 carry select means
1315 re-encryptor

What is claimed is:

1. A calculating unit for performing an operation on operands, wherein at least one of the operands is encrypted using an encryption algorithm and an encryption parameter so as to obtain an encrypted result of the operation, the calculating unit comprising:

a processing unit comprising a processing having an input for an operand or a negated version of the operand, an input for the at least one encrypted operand or a negated version of the at least one encrypted operand, having an input for the encryption parameter with which the at least one operand was encrypted, and having an output for the encrypted result, the processing unit being formed to perform one or several mathematical sub-operations which together result in a ciphertext calculating specification derived from a cleartext calculating specification for the operation with non-encrypted operands such that the non-encrypted operand is replaced, in the clear-text calculating specification from which the at least one encrypted operand results, by a mathematical combination of the at least one encrypted operand and the encryption parameter, the mathematical combination being a reversal of the encryption algorithm, and the clear-text calculating specification being transformed, due to the mathematical combination, into the one or several mathematical sub-operations representing the ciphertext calculating specification, which mathematical sub-operations obtain, as an input quantity, merely the encrypted operand or a negated version of same, or a combination of the encrypted operand or of the negated version of the encrypted operand with the other operands.

2. The calculating unit as claimed in claim 1, wherein the operands are numbers, and wherein the at least one operand is encrypted in a bitwise manner.

3. The calculating unit as claimed in claim 1, wherein the encryption algorithm comprises an XOR operation or an XNOR operation of the operand on a key as an encryption parameter.

4. The calculating unit as claimed in claim 1, wherein the encryption parameter is variable.

5. The calculating unit as claimed in claim 1, wherein the operation is a multiplexer operation for selecting one or several input signals as one or several output signals, a number of the one or several output signals being smaller than a number of the one or several input signals, the at least one encrypted operand being the control signal.

6. The calculating unit as claimed in claim 5, wherein the operation is a 2:1 multiplexer operation, and wherein the processing unit is formed to implement a calculating specification given by the following equation:

$$2:1 MUX: m' = b' \cdot x' \cdot k + a' \cdot \bar{x}' \cdot k + a' \cdot x' \cdot \bar{k} + b' \cdot \bar{x}' \cdot \bar{k}$$

wherein m'is an encrypted output signal, wherein a'is a first encrypted input signal, and b'is a second encrypted input signal, wherein x'is an encrypted control signal, and wherein k is an encryption parameter.

7. The calculating unit as claimed in claim 6, which comprises the following for performing the mathematical sub-operations:

a first inverter for negating the encryption parameter;
a second inverter for inverting the encrypted control signal;
first, second, third and fourth AND gates; and
an OR gate for ORing output signals of the first to fourth AND gates to obtain the output signal.

8. The calculating unit as claimed in claim 5, wherein the operation is a 3:1 multiplexer operation, wherein the control signal comprises two encrypted bits x', y', and wherein the processing unit is formed to implement the following calculating specification:

$$3:1 MUX: m' = c' \cdot x' \cdot \bar{y}' \cdot k + b' \cdot \bar{x}' \cdot y' \cdot k + c' \cdot \bar{x}' \cdot y' \cdot \bar{k} + b' \cdot x' \cdot \bar{y}' \cdot \bar{k} + a' \cdot x' \cdot y' + a' \cdot \bar{x}' \cdot \bar{y}'$$

wherein m' is the encrypted output signal, wherein a', b', c' are the first, second and third encrypted input signals, respectively, wherein x' is the first encrypted bit of the control signal, wherein y' is the second encrypted bit of the control signal, and wherein k is the encryption parameter for encrypting the first and second control signals.

9. The calculating unit as claimed in claim 5, wherein the operation is a 4:1 multiplexer operation, wherein the control signal comprises two encrypted bits x', y', and wherein the processing unit is formed to implement the following calculating specification:

$$4:1\ MUX: m' = d' \cdot \bar{x}' \cdot \bar{y}' \cdot k + c' \cdot x' \cdot \bar{y}' \cdot k + b' \cdot \bar{x}' \cdot y' \cdot k + a' \cdot x' \cdot y' \cdot k + d' \cdot x' \cdot y' \cdot \bar{k} + c' \cdot \bar{x}' \cdot y' \cdot \bar{k} + b' \cdot x' \cdot \bar{y}' \cdot \bar{k} + a' \cdot \bar{x}' \cdot \bar{y}' \cdot k$$

wherein m' is the encrypted output signal, wherein a', b', c', and d' are first, second, third, and fourth encrypted input signals, respectively, wherein x'is the first encrypted bit of the control signal, wherein y' is the second encrypted bit of the control signal, and wherein k is the encryption parameter for encrypting the first and second bits of the control signal.

10. The calculating unit as claimed in claim 1, wherein the operation is an arithmetic operation on at least two operands, the encrypted operand being one of the operands on which the arithmetic operation may be performed.

11. The calculating unit as claimed in claim 10, wherein the further operand(s) on which the operation may be performed is, or are, encrypted as well.

12. The calculating unit as claimed in claim 11,
wherein the arithmetic operation is an XOR operation, wherein the encrypted operands are binary and are, for encryption, XORed with a key in a bitwise manner, and wherein the arithmetic-logic unit comprises the following for performing the arithmetic sub-operations:
an XOR operation means for operating on the first encrypted operand, the second encrypted operand and the key to obtain the encrypted result.

13. The calculating unit as claimed in claim 11,
wherein the arithmetic operation is an AND operation, wherein the operands are binary and are, for encryption, XORed with a key in a bitwise manner, and wherein the arithmetic-logic unit comprises the following for performing the arithmetic sub-operations:
an AND operation means for operating on the first encrypted operand and the second encrypted operand to obtain a first intermediate result;
a further AND operation means for operating on the first encrypted operand and the key to obtain a second intermediate result;
a further AND operation means for operating on the encrypted second operand and the key to obtain a third intermediate result;
an OR operation means for operating on the first intermediate result and the second intermediate result to obtain a fourth intermediate result;
an OR operation means for operating on the second intermediate result and the fourth intermediate result to obtain the encrypted result.

14. The calculating unit as claimed in claim 11, wherein the arithmetic operation is an OR operation, wherein the operands are binary and are, for encryption, XORed with a key (k) in a bitwise manner, and wherein the arithmetic-logic unit comprises the following for performing the arithmetic sub-operations:
negation means for negating the key (k) to obtain a negated key;
first AND operation means for operating on the encrypted first operand and the negated key to obtain a first intermediate result;
second AND operation means for operating on the second encrypted operand and the negated key to obtain a second intermediate result;
third AND operation means for operating on the first encrypted operand and the second encrypted operand to obtain a third intermediate result;
first OR operation means for operating on the first intermediate result and the second intermediate result to obtain a fourth intermediate result;
second OR operation means for operating on the third intermediate result and the fourth intermediate result to obtain the encrypted result of the arithmetic operation.

15. The calculating unit as claimed in claim 11,
wherein the arithmetic operation is a NOR operation, wherein the operands are binary and, for encryption, are XORed with a key in a bitwise manner, and wherein the arithmetic-logic unit comprises the following for performing the arithmetic sub-operations:

first AND operation means for operating on the first encrypted operand and the second encrypted operand to obtain a first intermediate result;

first negation means for negating the first intermediate result to obtain a negated first intermediate result;

second negation means for negating the second encrypted operand to obtain a negated second encrypted operand;

second AND operation means for operating on the negated second operand and the key to obtain a second intermediate result;

third negation means for negating the first encrypted operand to obtain a negated first encrypted operand;

third AND operation means for operating on the negated encrypted first operand and the key to obtain a third intermediate result;

first OR operation means for operating on the negated first intermediate result and the second intermediate result to obtain a fourth intermediate result; and second OR operation means for operating on the third intermediate result and the fourth intermediate result to obtain the encrypted result of the arithmetic operation.

16. The calculating unit as claimed in claim 11, wherein the arithmetic operation is a NAND operation, wherein the operands are binary and, for encryption, are XORed with a key in a bitwise manner, and wherein the arithmetic-logic unit comprises the following for performing the arithmetic sub-operations:

first AND operation means for operating on the first encrypted operand and the second encrypted operand to obtain a first intermediate result;

first negation means for negating the first intermediate result to obtain a negated first intermediate result;

second AND operation means for operating on the second encrypted operand and the key to obtain a second intermediate result;

second negation means for negating the second intermediate result to obtain a negated second intermediate result;

third AND operation means for operating on the encrypted first operand and the key to obtain a third intermediate result;

third negation means for negating the third intermediate result to obtain a negated third intermediate result;

first OR operation means for operating on the negated first intermediate result and the negated second intermediate result to obtain a fourth intermediate result; and second OR operation means for operating on the fourth intermediate result and the third intermediate result to obtain an encrypted result of the arithmetic operation.

17. The calculating unit as claimed in claim 11, wherein the arithmetic operation is an ADD operation, wherein the operands are binary and, for encryption, are XORed with a key in a bitwise manner, and wherein the arithmetic-logic unit comprises the following for performing the arithmetic sub-operations:

first AND operation means for operating on the first encrypted operand and the second encrypted operand to obtain a first intermediate result;

second AND operation means for operating on the first encrypted operand and a third encrypted operand;

third AND operation means for operating on the second encrypted operand and the third encrypted operand to obtain a third intermediate result;

first OR operation means for operating on the first intermediate result and the second intermediate result to obtain a fourth intermediate result;

second OR operation means for operating on the fourth intermediate result and the third intermediate result to obtain an encrypted carry of the arithmetic ADD operation.

18. The calculating unit as claimed in claim 17, wherein the arithmetic operation is a NOT operation, and wherein the arithmetic-logic unit further comprises the following for performing the arithmetic sub-operations:

additional negation means for negating the encrypted carry to obtain the encrypted result of the NOT operation.

19. The calculating unit as claimed in claim 11, wherein the first encrypted operand and the second encrypted operand are encrypted using two different encryption algorithms and/or encryption keys, and wherein the arithmetic-logic unit further comprises:

a further input for a further encryption parameter.

20. The calculating unit as claimed in claim 1, wherein the arithmetic-logic unit is formed such that merely AND operation means and OR operation means having two inputs, respectively, are used.

21. The calculating unit as claimed in claim 1, wherein at least two operands are encrypted, the first encrypted operand being encrypted with a first encryption algorithm and a first encryption parameter, the second operand being encrypted with a second encryption algorithm and a second encryption parameter, wherein the processing unit comprises a further input for the second encryption parameter, and wherein the ciphertext calculating specification is derived from the clear-text calculating specification such that the non-encrypted operand, which corresponds to the second encrypted operand, is replaced by a further mathematical combination of the second encrypted operand and the second encryption parameter, the further combination being a reversal of the second encryption algorithm.

22. The calculating unit as claimed in claim 21, wherein the first and the second encryption algorithms are identical, and wherein the first and second encryption parameters are different.

23. The calculating unit as claimed in claim 21, wherein a result of the operation is encrypted with a third encryption algorithm and a third encryption parameter, wherein the ciphertext calculating specification, which results from the plurality of mathematical sub-operations, is derived from the clear-text calculating specification for the operation with non-encrypted operands such that a non-encrypted result of the operation is replaced by a further mathematical combination of the non-encrypted result of the operation and the third encryption parameter.

24. The calculating unit as claimed in claim 23, wherein the third encryption parameter is a combination of the first and second encryption parameters.

25. The calculating unit as claimed in claim 24, wherein all encryption algorithms are given by an XOR operation, wherein the mathematical combinations are given by an XOR operation, and wherein the third encryption parameter is an XOR operation of the first and second encryption parameters.

26. The calculating unit as claimed in claim 25, wherein the processing unit is formed to perform a plurality of mathematical sub-operations which are given by the following ciphertext calculating specification, respectively:

for an AND operation:
$$\text{AND: } r^{(k)} \leftarrow a^{(i)} \cdot b^{(j)} \cdot \bar{j} + \bar{a}^{(i)} \cdot \bar{b}^{(j)} \cdot j + b^{(j)} \cdot \bar{i} \cdot j + \bar{b}^{(j)} \cdot i \cdot \bar{j};$$

for an OR operation:
$$\text{OR: } r^{(k)} \leftarrow a^{(i)} \bar{b}^{(j)} \bar{j} + \bar{a}^{(i)} b^{(j)} j + b^{(j)} \bar{i} j + \bar{b}^{(j)} i j;$$

for a NAND operation:
$$\text{NAND: } r^{(k)} \leftarrow \bar{a}^{(i)} b^{(j)} \bar{j} + a^{(i)} \bar{b}^{(j)} j + b^{(j)} i j + \bar{b}^{(j)} \bar{i} \bar{j};$$

for a NOR operation:
$$\text{NOR: } r^{(k)} \leftarrow \bar{a}^{(i)} \bar{b}^{(j)} \bar{j} + a^{(i)} b^{(j)} j + b^{(j)} i \bar{j} + \bar{b}^{(j)} \bar{i} j;$$

for an XOR operation:
$$\text{XOR: } r^{(k)} \leftarrow a^{(i)} \cdots b^{(j)};$$

for an XNOR operation:
$$\text{XNOR: } r^{(k)} \leftarrow \bar{a}^{(i)} \cdots b^{(j)};$$

for a full adder function with the following aggregate bit:
$$\text{SUM: } r^{(k)} \leftarrow (a^{(i)} \cdots j) \cdots (b^{(j)} \cdots i) \cdots c_{in}^{(k)}; \text{ or}$$

for a full adder function with a carry bit:
$$\text{CARRY: } r^{(k)} \leftarrow (a^{(i)} \cdots j)(b^{(j)} \cdots i) + (a^{(i)} \cdots j) c_{in}^{(k)} + (b^{(j)} \cdots i) c_{in}^{(k)};$$

wherein $a^{(i)}$ is the first operand encrypted with the first encryption parameter, wherein $b^{(j)}$ is the second operand encrypted with the second encryption parameter, wherein i is the first encryption parameter, wherein j is the second encryption parameter, wherein k is the third encryption parameter, wherein the third encryption parameter is identical with the XOR operation of the first and second encryption parameters, wherein $r^{(k)}$ is the result of the operation encrypted with the third encryption parameter, and wherein $c_{in}^{(k)}$ is a carry input encrypted with the third encryption parameter.

27. A method for performing an operation on operands using a calculating unit, wherein at least one of the operands is encrypted using an encryption algorithm and an encryption parameter to obtain an encrypted result of the operation, the method comprising:

performing, by a processing unit comprising a processing, one or several mathematical sub-operations which together result in a ciphertext calculating specification derived from a clear-text calculating specification for the operation with non-encrypted operands, such that the non-encrypted operand, from which the at least one encrypted operand results, is replaced by a mathematical combination of the at least one encrypted operand and the encryption parameter, the mathematical combination being a reversal of the encryption algorithm, and the clear-text calculating specification being transformed, due to the mathematical combination, into the one or several mathematical sub-operations representing the ciphertext calculating specification, which mathematical sub-operations obtain, as an input quantity, merely the encrypted operand or a negated version of same, or a combination of the encrypted operand or of the negated version of the encrypted operand with the other operands.

* * * * *

UNITED STATES PATENT AND TRADEMARK OFFICE
CERTIFICATE OF CORRECTION

PATENT NO. : 7,567,668 B2
APPLICATION NO. : 10/893163
DATED : July 28, 2009
INVENTOR(S) : Berndt Gammel et al.

It is certified that error appears in the above-identified patent and that said Letters Patent is hereby corrected as shown below:

At column 25, line 25, Claim 6, delete "m'is" and insert -- m' is -- therefor

At column 25, line 25, Claim 6, delete "a'is" and insert -- a' is -- therefor

At column 25, line 26, Claim 6, delete "b'is" and insert -- b' is -- therefor

At column 25, line 27, Claim 6, delete "x'is" and insert -- x' is -- therefor

At column 25, line 63, Claim 9, delete "k" (last occurrence) and insert -- $\overline{k}$ -- therefor At column 26, line 1, Claim 9, delete "x'is" and insert -- x' is -- therefor At column 29, line 16, Claim 26, delete "..." and insert -- $\oplus$ -- therefor At column 29, line 19, Claim 26, delete "..." and insert -- $\oplus$ -- therefor At column 29, line 22, Claim 26, delete "..." (first occurrence) and insert -- $\oplus$ -- therefor At column 29, line 22, Claim 26, delete "..." (second occurrence) and insert -- $\oplus$ -- therefor At column 29, line 22, Claim 26, delete "..." (third occurrence) and insert -- $\oplus$ -- therefor At column 29, line 22, Claim 26, delete "..." (fourth occurrence) and insert -- $\oplus$ -- therefor At column 29, line 22, Claim 26, delete "..." and insert -- $\oplus$ -- therefor At column 29, line 25, Claim 26, delete "..." (first occurrence) and insert -- $\oplus$ -- therefor At column 29, line 25, Claim 26, delete "..." (second occurrence) and insert -- $\oplus$ -- therefor At column 29, line 25, Claim 26, delete "..." (third occurrence) and insert -- $\oplus$ -- therefor

UNITED STATES PATENT AND TRADEMARK OFFICE
CERTIFICATE OF CORRECTION

PATENT NO. : 7,567,668 B2
APPLICATION NO. : 10/893163
DATED : July 28, 2009
INVENTOR(S) : Berndt Gammel et al.

It is certified that error appears in the above-identified patent and that said Letters Patent is hereby corrected as shown below:

At column 29, line 25, Claim 26, delete "..." (third occurrence) and insert -- $\oplus$ -- therefor At column 29, line 26, Claim 26, delete "..." and insert -- $\oplus$ -- therefor At column 30, line 11, Claim 27, delete "processing" (first occurrence) and insert -- processor -- therefor Signed and Sealed this Seventeenth Day of November, 2009

David J. Kappos
*Director of the United States Patent and Trademark Office*